US011245478B1

(12) United States Patent
Dunne

(10) Patent No.: US 11,245,478 B1
(45) Date of Patent: Feb. 8, 2022

(54) METHOD AND SYSTEM FOR DETERMINING RELATIVE COMPLEX GAIN OF CHANNELS IN PHASE ARRAY ANTENNA

(71) Applicant: Keysight Technologies, Inc., Santa Rosa, CA (US)

(72) Inventor: David Dunne, Edinburgh (GB)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 17/148,172

(22) Filed: Jan. 13, 2021

Related U.S. Application Data

(60) Provisional application No. 62/982,177, filed on Feb. 27, 2020.

(51) Int. Cl.
*H04B 17/00* (2015.01)
*H04B 17/21* (2015.01)

(52) U.S. Cl.
CPC .................................. *H04B 17/21* (2015.01)

(58) Field of Classification Search
CPC ........ H04B 17/00; H04B 17/20; H04B 17/21; H04B 17/29; H04B 17/30; H04B 17/409; H04W 24/00
See application file for complete search history.

(56) References Cited

U.S. PATENT DOCUMENTS

| | | | |
|---|---|---|---|
| 6,295,027 B1 | 9/2001 | Wixforth et al. | |
| 6,411,612 B1 * | 6/2002 | Halford | H01Q 1/246 370/347 |
| 6,747,595 B2 | 6/2004 | Hirabe | |
| 2012/0062423 A1 * | 3/2012 | Lo | H01Q 1/2258 342/374 |
| 2014/0022125 A1 * | 1/2014 | Zhu | H01Q 3/2611 342/377 |
| 2018/0198537 A1 | 7/2018 | Rexberg et al. | |

* cited by examiner

*Primary Examiner* — Tuan Pham

(57) ABSTRACT

A method is provided for performing receiver and transmitter tests of a phased array antenna using a test system including probe antennas for transmitting and receiving RF signals, respectively. For the receiver tests, the method includes receiving the RF signals at receiver channels over propagation paths corresponding to the probe antennas, where each of the receiver channels is set at a selected complex gain setting of multiple available complex gain settings; measuring a combined receive signal output from a single combined output of the phased array antenna; isolating complex gain and complex path loss products from the measured combined receive signal corresponding to the selected complex gain setting and the propagation paths at each of the receiver channels; and determining a relative value between the complex gain of one receiver channel and previous complex gain of the one receiver channel using the isolated complex gain and complex path loss products.

20 Claims, 7 Drawing Sheets

METHOD AND SYSTEM FOR DETERMINING RELATIVE COMPLEX GAIN OF CHANNELS IN PHASE ARRAY ANTENNA

CROSS-REFERENCE TO RELATED APPLICATION

The present application claims priority under 35 U.S.C. § 119(e) to U.S. Provisional Application No. 62/982,177 filed on Feb. 27, 2020. The entire disclosure of U.S. Provisional Application No. 62/982,177 is specifically incorporated herein by reference in its entirety.

BACKGROUND

Many radio frequency (RF) systems incorporate phased array antennas, including radar systems and telecommunications systems, for example. Such RF systems are calibrated and tested for research and development (R&D) purposes, as well as for quality assurance of commercial products. The calibration and testing may include over-the-air (OTA) measurements of RF signals communicated between a test system having one or more probe antennas and an antenna under test (AUT) that is a phased array antenna. The measurement challenge is further complicated when the phased array antenna presents a single output for measuring a combined RF signal from multiple receiver channels that receive corresponding RF signals from probe antennas, as well as a single input for providing a transmit signal that is split among multiple transmitter channels that transmit corresponding RF signals to the probe antennas. This is because the characteristics of the individual receiver and transmitter channels cannot be accurately isolated and measured during testing.

OTA measurements on a phased array antenna generally require illumination with a plane wave front. This ensures that RF signals arriving at the phased array antenna have the same amplitude and phase, so that useful comparisons may be made among the individual antenna elements and channels of the phased array antenna. Conventionally, a plane wave front may be achieved using a far-field test range. The size of the far-field test range depends on the dimensions of the phased array antenna and the operating frequency. Generally, the longer the far-field range, the better the plane wave front approximation becomes, so the far-field test range may need to be meters or even tens of meters in length to provide an acceptable plane wave front. The entire test system, including of the probe antennas and propagation paths between the probe antennas and the antenna elements of the phased array antenna, is enclosed within an anechoic chamber.

Conventional compact antenna test ranges (CATRs) make use of a parabolic reflector to approximate a plane wave illumination of the AUT, which may reduce the size of the test range considerably. However, there is still a trade-off between the physical size of the test range and the amplitude and phase variation across the plane wave front illuminating the phased array antenna. CATRs are typically room-sized. Neither of these types of conventional test ranges is optimized for R&D or production test environments. The large size in particular is a disadvantage.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
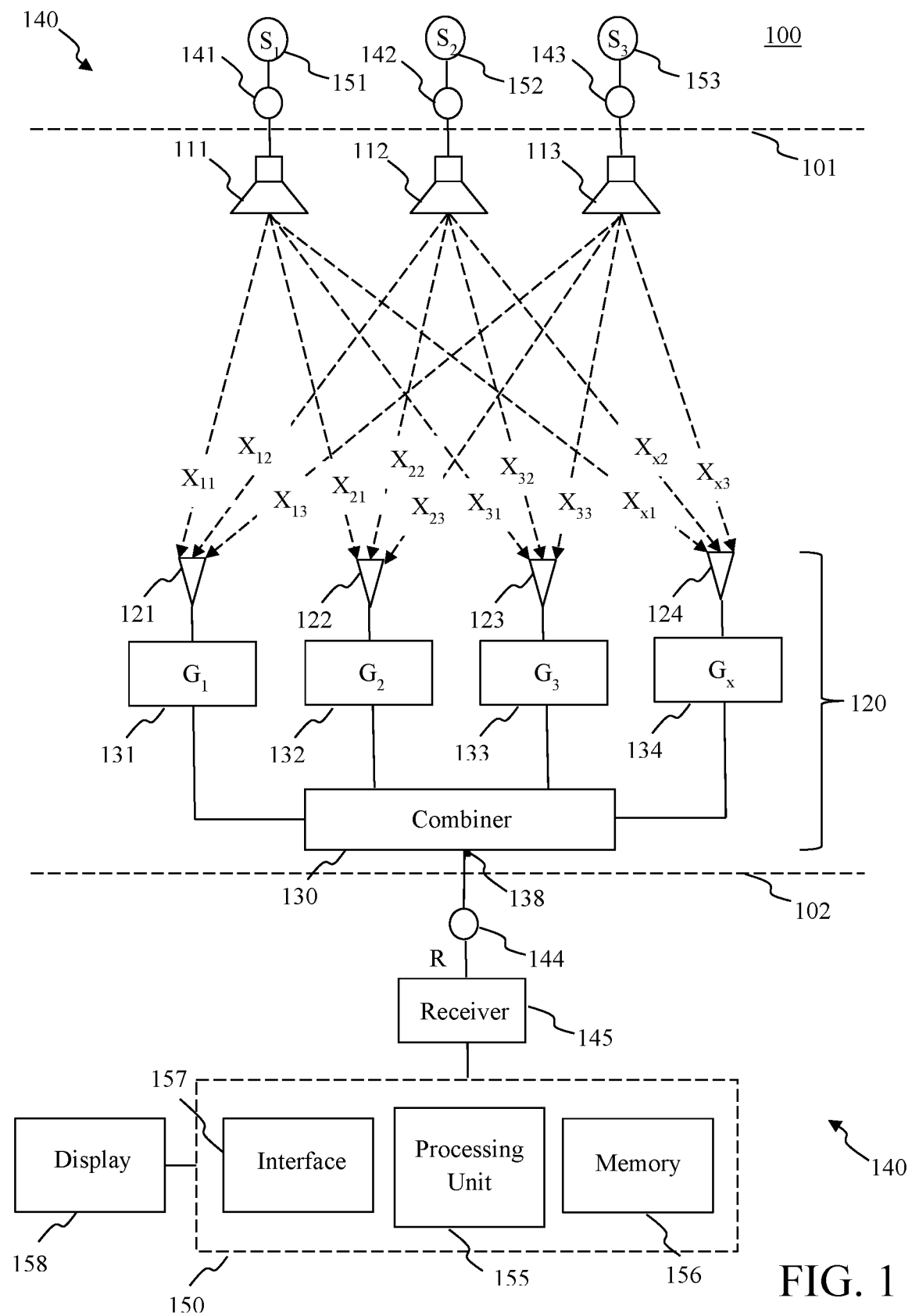
FIG. 1 is a simplified block diagram showing a test system for isolating individual receiver channels of a phased array antenna with a single combined output port, according to a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to" or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

Various embodiments described herein provide an OTA test range for performing measurements and/or calibrations for a phased array antenna of an antenna under test (AUT) without using a far-field test range. The OTA specifically enables analysis of multiple antenna elements and corresponding receiver channels combined to provide a single RF or intermediate frequency (IF) output and/or corresponding transmitter channels that have a single RF input to the AUT. Thus, the OTA measurements on the phase array antenna may be made in both receive and transmit modes.

According to the various embodiments, the amplitude and phase responses of at least three channels of the phased array antenna and their associated propagation paths to or from probe antennas of the test system are determined from the same set of measurements. The number of channels may be extended beyond three, if needed, at the expense of additional computational complexity, although in an embodiment, the measurements are performed for three channels at a time, even when there are more than three channels in the phased array antenna.

FIG. 1 is a simplified block diagram showing a test system for isolating individual receiver channels of a phased array antenna with a single combined output port, according to a representative embodiment.

Referring to FIG. 1, a test system 100 is shown configured to transmit RF signals that are received by a phased array antenna 120 of an antenna under test (AUT) including an output combiner 130 with a single output port 138. The test system 100 includes a measurement instrument 140 with a receiver 145, multiple signal sources for generating RF signals connected to probe antennas indicated by representative first signal source 151 (source voltage $S_1$) connected to a first probe antenna 111, second signal source 152 (source voltage $S_2$) connected to a second probe antenna 112, and third signal source 153 (source voltage $S_3$) connected to a third probe antenna 113. The measurement instrument 140 further includes or is otherwise connected to a processing unit 150 discussed below. The test system 100 may be configured to receive RF signals transmitted by the phased array antenna 120 (e.g. phased array antenna 520 in FIG. 5), in which case the output combiner 130 in the AUT is replaced by a splitter (e.g., splitter 530) configured to distribute a signal to be transmitted by the AUT, the receiver 145 in the measurement instrument 140 is replaced by a signal source (e.g., signal source 545), and the first, second and third signal sources 151, 152 and 153 in the measurement instrument 140 are replaced by receivers (first, second and third receivers 551, 552 and 553), as discussed below with reference to FIG. 5.

The measurement instrument 140 may be implemented by a vector network analyzer (VNA), for example, although any test equipment capable of measuring amplitude and phase of RF signals with its receivers and controlling the amplitude and phase of its signal sources may be incorporated without departing from the scope of the present teachings. In the depicted embodiment, the measurement instrument 140 includes multiple ports for sending and receiving RF signals provided by the first, second and third signal sources 151, 152 and 153. A first port 141 is connected to the first probe antenna 111, a second port 142 is connected to the second probe antenna 112, and a third port 143 is connected to the third probe antenna 113 for sending RF signals to be transmitted to the phased array antenna 120. In an embodiment, the RF signals may be generated by signal sources separate from the measurement instrument 140, without departing from the scope of the present teachings. The amplitude and phase of the first, second and third signal sources 151, 152 and 153 sources driving the first, second and third probe antennas 111, 112 and 113 may be set independently. A fourth port 144 is connected to the single output port 138 of the output combiner 130 for receiving a combined receive signal from the phased array antenna 120.

The phased array antenna 120 includes multiple antenna elements arranged in a fixed pattern in relation to one another, and corresponding receive channels, for receiving the RF signals sent by the first, second and third probe antennas 111, 112 and 113. In the depicted embodiment, the phased array antenna 120 includes a first antenna element 121 connected to a first receiver channel 131, a second antenna element 122 connected to a second receiver channel 132, and a third antenna element 123 connected to a third receiver channel 133. The output combiner 130 is configured to combine RF signals received by the antenna elements and receive channels of phased array antenna 120 into the combined receive signal. The phased array antenna 120 may have an arbitrary number of antenna elements and receive channels, but they are measured in groups of three according to a representative embodiment. Accordingly, the three antenna elements to be measured as shown in FIG. 1 are the first, second and third antenna elements 121, 122 and 123. A fourth antenna element 124 represents all other antenna elements that may be included in the phased array antenna 120 and connected to the output combiner 130. Thus, the fourth antenna element 124 is not directly part of the measurement discussed below, but is included as a noise term. In an alternative embodiment, the phased array antenna 120 has two antenna elements (e.g., first and second antenna elements 121 and 122) and the test system 100 has two probe antennas (e.g., first and second probe antennas 111 and 112). At least the phased array antenna 120, and the first, second and third probe antennas 111, 112 and 113 are contained within an anechoic chamber (not shown), while the measurement instrument 140 may be located outside the anechoic chamber.

A first reference plane 101 is shown at the first, second and third ports 141, 142 and 143 of the measurement instrument 140 for measuring transmitted signals at the first, second and third probe antennas 111, 112 and 113. A second reference plane 102 is shown at the fourth port 144 of the measurement instrument 140 for measuring the received signals at the single output port 138 of the AUT.

In the depicted embodiment, the measurement instrument 140 may operate under control of the processing unit 150, and measurement results may be provided by the measurement instrument 140 to the processing unit 150 for further processing and analysis. For example, the processing unit 150 may be control the RF signals provided by the first, second and third signal sources 151, 152 and 153, and may receive a digitized combined receive signal from the receiver 145. The processing unit 150 may be included in the measurement instrument 140, or may be a separate device, such as a host computer, a controller or a workstation, connected to the measurement instrument 140 by a wired or wireless connection.

The processing unit 150 includes a processor device 155, memory 156, and an interface 157. The processor device 155, together with the memory 156, implements the methods of performing receiver tests of a phased array antenna with multiple OTA receiver channels and a single combined output, and may be configured to perform and/or control all or a portion of the steps of the processes shown in FIGS. 2 and 3, discussed below. In various embodiments, the processor device 155 may include one or more computer processors, digital signal processors (DSP), field-programmable gate arrays (FPGAs), application specific integrated circuits (ASICs), or combinations thereof, using any combination of hardware, software, firmware, hard-wired logic circuits, or combinations thereof. The processor device 155 may include its own processing memory (e.g., memory 156) for storing computer readable code (e.g., software, software modules) that enables performance of the various functions described herein. For example, the memory 156 may store software instructions/computer readable code executable by the processor device 155 (e.g., computer processor) for performing some or all aspects of methods described herein.

References to the processor device 155 may be interpreted to include one or more processing cores, as in a multi-core processor. The processor device 155 may also refer to a collection of processors within a single computer system or distributed among multiple computer systems, as well as a collection or network of computing devices each including a processor or processors. Programs have software instructions performed by one or multiple processors that may be within the same computing device or which may be distributed across multiple computing devices.

The processing memory, as well as other memories and databases, collectively represented by the memory 156, as described herein may be random-access memory (RAM), read-only memory (ROM), flash memory, electrically programmable read-only memory (EPROM), electrically erasable and programmable read only memory (EEPROM), registers, a hard disk, a removable disk, tape, compact disk read only memory (CD-ROM), digital versatile disk (DVD), registers, a hard disk, a removable disk, tape, floppy disk, blu-ray disk, or universal serial bus (USB) driver, or any other form of storage medium known in the art, which are tangible and non-transitory storage media (e.g., as compared to transitory propagating signals). Memories may be volatile or non-volatile, secure and/or encrypted, unsecure and/or unencrypted, without departing from the scope of the present teachings. As mentioned above, the memory 156 is representative of one or more memories and databases, including the processing memory, as well as multiple memories and databases, including distributed and networked memories and databases.

The interface 157 may include a user interface and/or a network interface for providing information and data output by the processor device 155 and/or the memory 156 to the user and/or for receiving information and data input by the user. That is, the interface 157 enables the user to enter data and to control or manipulate aspects of the process of performing OTA receiver tests of a phased array antenna, and also enables the processor device 155 to indicate the effects of the user's control or manipulation. The interface 157 may include one or more of ports, disk drives, wireless antennas, or other types of receiver circuitry. For example, the processing unit 150 may retrieve or otherwise receive data and instructions via the interface 157 from a website, an email, a portable disk or other type of memory, including an external database. The interface 157 may further connect one or more user interfaces, such as a mouse, a keyboard, a mouse, a trackball, a joystick, a microphone, a video camera, a touchpad, a touchscreen, voice or gesture recognition captured by a microphone or video camera, for example.

The display 158 may be a monitor such as a computer monitor, a television, a liquid crystal display (LCD), an organic light emitting diode (OLED), a flat panel display, a solid-state display, or a cathode ray tube (CRT) display, or an electronic whiteboard, for example. The display 158 and/or the processor device 155 may include one or more display interface(s), in which case the display 158 may provide a graphical user interface (GUI) for displaying and receiving information to and from a user.

FIG. 1 further shows RF signal propagation paths from each of the first, second and third probe antennas 111, 112 and 113 to each of the first, second and third antenna elements 121, 122 and 123 of the phased array antenna 120. For purposes of discussion, $X_{nm}$ indicates the complex path loss (amplitude and phase) of the propagation paths, where n is the number of the antenna element of the phased array antenna 120 receiving the RF signal and m is the number of the probe antenna sending the RF signal on the corresponding propagation path. Accordingly, the first antenna element 121 receives RF signals from the first, second and third probe antennas 111, 112 and 113 on propagation paths having complex path losses $X_{11}$, $X_{12}$ and $X_{13}$ respectively, the second antenna element 122 receives RF signals from the first, second and third probe antennas 111, 112 and 113 on propagation paths having complex path losses $X_{21}$, $X_{22}$ and $X_{23}$ respectively, and the third antenna element 123 receives RF signals from the first, second and third probe antennas 111, 112 and 113 on propagation paths having complex path losses $X_{31}$, $X_{32}$ and $X_{33}$ respectively. The directional gains of the antenna elements are included in the corresponding complex path losses $X_{nm}$, respectively.

Further, for purposes of discussion, $G_n$ indicates the complex gain (amplitude and phase) of each of the first, second and third receiver channels 131, 132 and 133, where the number n of the receiver channel is the same as the corresponding antenna element. The receiver channel complex gain, as well as any losses in the corresponding antenna element feeds, are included in the $G_n$ terms. Each of the first, second and third receiver channels 131, 132 and 133 has multiple available complex gain settings that are adjustable by a user to accommodate testing. The complex gain of the notional fourth receiver channel is indicated as $G_x$, which represents all other receiver channels of the phased array antenna 120 in addition to the first, second and third receiver channels 131, 132 and 133.

Therefore, the RF signals output from each of the first, second and third receiver channels 131, 132 and 133 may be represented by a set of products of the complex path losses and the complex gain $X_{nm}G_n$ (referred to as "receiver products"). So, the output of the first receiver channel 131 is represented by the receiver products $X_{11}G_1$, $X_{12}G_1$ and $X_{13}G_1$, the output of the second receiver channel 132 is represented by the receiver products $X_{21}G_2$, $X_{22}G_2$ and $X_{23}G_2$, and the output of the third receiver channel 133 is represented by the receiver products $X_{31}G_3$, $X_{32}G_3$ and $X_{33}G_3$. The respective complex gains are useful in determining whether the first, second and third receiver channels 131, 132 and 133 are functioning properly. However, because the RF signals received by the first, second and third receiver channels 131, 132 and 133 are combined by the output combiner 130, and output as the combined receive signal via the output port 138, the respective complex gains are not readily identifiable. Therefore, the receiver products $X_{nm}G_n$ and subsequently the complex gain terms $G_n$ must first be isolated, as described below.

Figure 2:
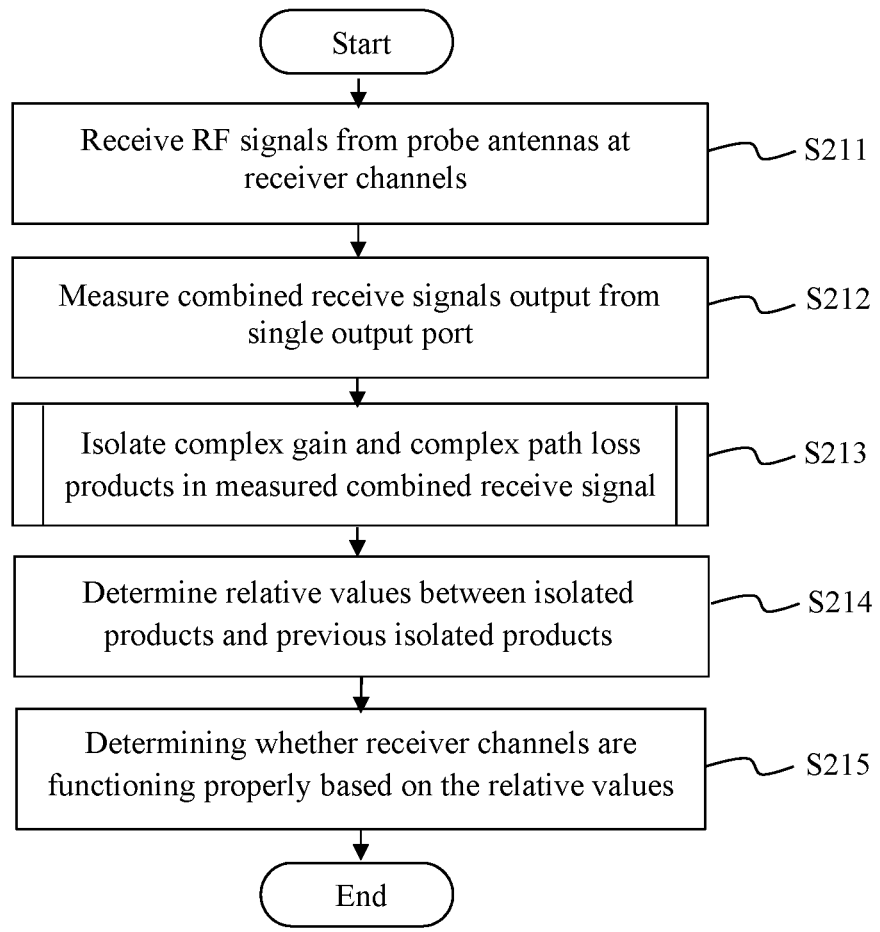
FIG. 2 is a simplified flow diagram depicting a method of performing receiver tests of a phased array antenna with multiple over-the-air (OTA) receiver channels and a single combined output, according to a representative embodiment.

FIG. 2 is a simplified flow diagram depicting a method of performing receiver tests of a phased array antenna with multiple over-the-air (OTA) receiver channels and a single combined output, according to a representative embodiment.

Generally, in the depicted example, the objective is to determine the twelve receiver product unknowns $X_{21}G_2$, $X_{22}G_2$, $X_{23}G_2$, $X_{31}G_3$, $X_{32}G_3$, $X_{33}G_3$, $X_{X1}G_X$, $X_{X2}G_X$ and $X_{X3}G_X$ of the test system. However, these quantities can be measured only as their sum retrieved from the combined receive signal. The number probe antennas of the test system 100 and the number of receiver channels of the phased array antenna 120 in FIG. 1 are illustrative, and may vary, provided there are at least two probe antennas and at least two receiver channels, to provide unique benefits for any particular situation or to meet application specific design requirements of various implementations, as would be apparent to one skilled in the art.

Referring to FIG. 2, at block S211, RF signals are received from the first, second, and third probe antennas 111, 112 and 113 at each of the first, second and third receiver channels 131, 132 and 133 over the propagation paths corresponding to the first, second and third probe antennas 111, 112 and 113, respectively. The RF signals are also received from the first, second, and third probe antennas 111, 112 and 113 at the notional fourth receiver channel 134. The complex path loss is indicated by ($X_{x1}$, $X_{x2}$, $X_x$) and the complex gain is indicated by ($G_x$) with respect to the fourth receiver channel 134. Each of the first, second and third receiver channels 131, 132 and 133 is set at a selected complex gain setting of the multiple available complex gain settings, where each of the available complex gain settings selects a corresponding gain and phase. The RF signals are combined by the output combiner 130, and output from the single output port 138 as the combined receive signals.

In block S212, the combined receive signals output from the output port 138 are measured by the measurement instrument 140, for example, at the fourth port 144. The receiver products ($X_{11}G_1$, $X_{12}G_1$, $X_{13}G_1$, $X_{21}G_2$, $X_{22}G_2$, $X_{23}G_2$, $X_{31}G_3$, $X_{32}G_3$, $X_{33}G_3$, $X_{X1}G_X$, $X_{X2}G_X$, $X_{X3}G_X$) are then isolated from the measured combined receive signals in the process indicated by block S213. The receiver products correspond to products of the complex gain ($G_n$) and the complex path losses ($X_{nm}$) at each of the first, second and third receiver channels 131, 132 and 133.

As stated above, because of a single combined receive signal from the output port 138, twelve orthogonal test conditions need to be identified in order to develop a system of twelve orthogonal equations for determining the twelve receiver product unknowns. Generally, signal sources for the first, second and third probe antennas 111, 112 and 113 are turned on one at a time, while the other two signal sources are off, thereby supplying three orthogonal test conditions. Also, pairs of the signal sources for the first, second and third probe antennas 111, 112 and 113 are turned on under conditions such that the RF signals from the pair of signal sources arriving at one of the first, second and third receiver channels 131, 132 and 133 are canceled by applying an appropriate amplitude/phase transmit scaling factor (k-factor). These cancellations for each pair of the signal sources at each of the first, second and third receiver channels 131, 132 and 133 provide corresponding orthogonal test conditions, thereby supplying nine additional orthogonal test conditions, for a total of twelve. The scaling factors for the pairs of the signal sources are determined using pre-tuning measurements that take advantage of the fact that when cancellation of the RF signal occurs, the output from the receiver channel involved is independent of its complex gain setting, and therefore does not change, as discussed below.

Figure 3:
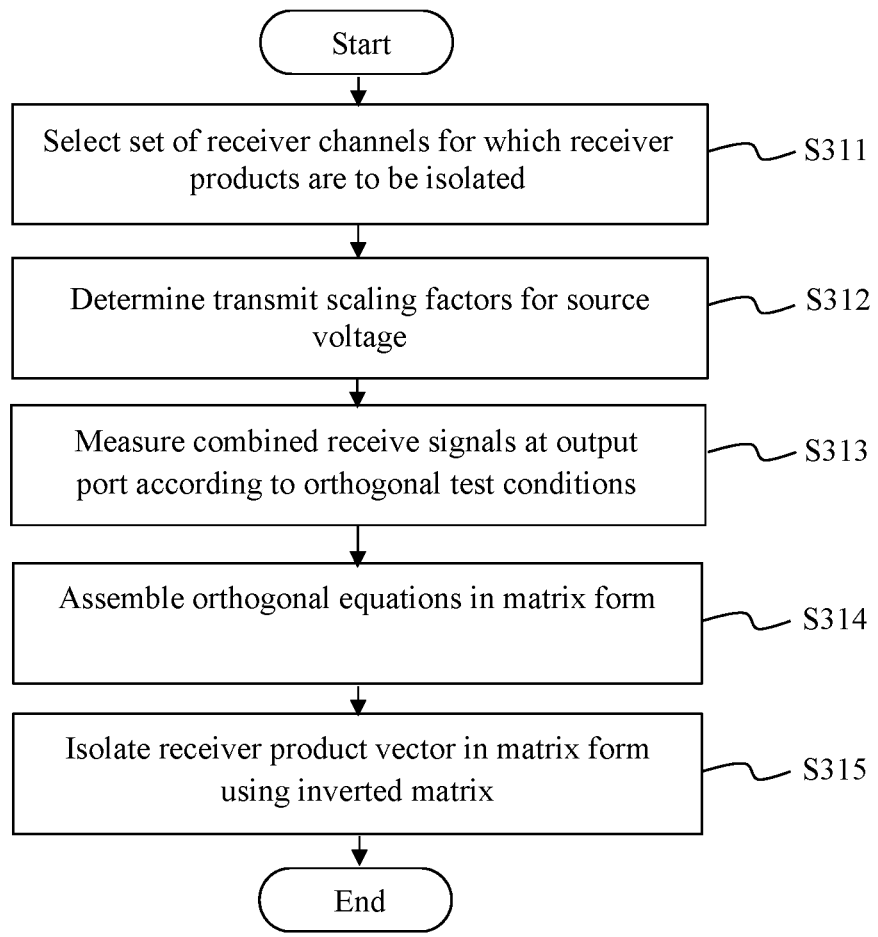
FIG. 3 is a simplified flow diagram depicting a method of isolating the complex gain and complex path loss products of the receiver channels, according to a representative embodiment.

FIG. 3 is a simplified flow diagram depicting a method of isolating the receiver products of the receiver channels in block S213, according to a representative embodiment.

Referring to FIG. 3, in block S311, a set of receiver channels is selected for which the receiver products are to be isolated. The selected set of receiver channels may include all receiver channels ($N_0$) of the phased array antenna, or some number of receiver channels (N) less than all receiver channels of the phased array antenna. At a minimum, there will be two antenna probes and two receiver channels. When the selected set of receiver channels includes $N_0$ receiver channels, the number P of receiver products to be isolated for M probe antennas is $M*N_0$. When the selected set of receiver channels includes N receiver channels (less than $N_0$), the number P of receiver products to be determined for M probe antennas is M(N+1). In the example depicted in FIG. 1, there are three probe antennas (first, second and third probe antennas 111, 112 and 113), four receiver channels (first, second, and third receiver channels 131, 132 and 133 and the notional fourth receiver channel 134) and three receiver channels (first, second and third channels 131, 132 and 133) in the selected set of receiver channels. So, M=3, $N_0$=4 or greater, N=3, and the number P of receiver products to be determined is 3(3+1), or 12.

Accordingly, when there are three receiver channels under consideration, there will be 12 measurements, i.e., four measurements per receiver channel. In other embodiments, there may be more than three receiver channels in the consideration. For example, using three probe antennas, when four receiver channels are considered (plus the notional channel to account for additional channels of the phased array antenna not in the consideration), the number P of receiver products to be determined would be 3(4+1), or 15. Accordingly, there would be 15 receiver products to determine or 15 measurements to make, which is 3.75 measurements per receiver channel. As the number of receiver channels in the consideration increases, the measurements per receiver channel tends toward three measurements per receiver channel. So, it is the case generally that, as the number of receiver channels in the consideration increases, the fewer measurements need to be made to completely characterize all receiver channels in the AUT. However, the computational load increases significantly with each additional receiver channel in the consideration because of the need to invert an increasingly larger matrix, as discussed below. Overall measurement time comes down to two factors: measurement time and computational time. To the extent that computational time is the dominant consideration, measuring three receiver channels at a time may be favored.

In a special case where the AUT has only two receiver channels, three probe antennas may be used, although a test system consisting of only two signal sources and two probe antennas is more optimum. In this configuration, there are four receiver products to be isolated ($X_{11}G_1, X_{21}G_2, X_{22}G_2$). These four receiver products can be determined in a single consideration by making four orthogonal measurements. Two of the orthogonal measurements are made with each of the two signal sources turned on, while the other signal source is turned off. Two additional measurements are made under conditions such that both of the two signal sources are turned one, while the scaling factor is applied to one of signal sources to cancel the RF signals arriving at one of the first and second receiver channels, discussed below.

In block S312, transmit scaling factors $k_{n(xy)}$ (k-factors) are determined from P minus M pre-tuning procedures, which in the present example is nine. In particular, the scaling factor may be determined using three different pairs of the first, second and third signal sources 151, 152 and 153 stimulating the first, second and third probe antennas 111, 112 and 113, respectively, where when one pair of signal sources is on, the remaining signal source is off. This results in stimulated pairs of probe antennas from among the first, second and third probe antennas 111, 112 and 113. Each scaling factor $k_{n(xy)}$, when applied between pairs of signal sources, cancels the RF signal arriving at a particular receiver channel from the stimulated pair of probe antennas, where n is the one receiver channel of the first, second and third receiver channels 131, 132 and 133 at which the RF signal is cancelled, and xy is the stimulated pair of probe antennas corresponding to the signal sources that are turned on. Using this nomenclature, the scaling factors for the nine combinations of receiver channels and stimulated pairs of probe antennas are as follows:

$k_{1(12)}$ is the scaling factor that cancels RF signals at the first receiver channel 131 using source voltages from the first and second probe antennas 111 and 112;

$k_{2(12)}$ is the scaling factor that cancels RF signals at the second receiver channel 132 using source voltages from the first and second probe antennas 111 and 112;

$k_{3(12)}$ is the scaling factor that cancels RF signals at the third receiver channel 133 using source voltages from the first and second probe antennas 111 and 112;

$k_{1(13)}$ is the scaling factor that cancels RF signals at the first receiver channel 131 using source voltages from the first and third probe antennas 111 and 113;

$k_{2(13)}$ is the scaling factor that cancels RF signals at the second receiver channel 132 using source voltages from the first and third probe antennas 111 and 113;

$k_{3(13)}$ is the scaling factor that cancels RF signals at the third receiver channel 133 using source voltages from the first and third probe antennas 111 and 113;

$k_{1(23)}$ is the scaling factor that cancels RF signals at the first receiver channel 131 using source voltages from the second and third probe antennas 112 and 113;

$k_{2(23)}$ is the scaling factor that cancels RF signals at the second receiver channel 132 using source voltages from the second and third probe antennas 112 and 113; and $k_{3(23)}$ is the scaling factor that cancels RF signals at the third receiver channel 133 using source voltages from the second and third probe antennas 112 and 113.

In an embodiment, determining the scaling factors that cause the RF signals arriving at one of the receiver channels from stimulated pairs of probe antennas may be determined empirically. For example, the source voltages applied to a corresponding stimulated pair of probe antennas are initially set to the same value, and the combined receive signal is measured at the output port 138. While maintaining the same voltage value of the source voltage applied to one probe antenna, the complex gain of the source voltage applied to the other probe antenna is adjusted until the RF signals arriving at the receiver channel cancel. The cancellation of the RF signals may be identified by monitoring the combined receive signal at the output port 138 while changing the complex gain of the receiver channel. When changing the complex gain does not change the amplitude or the phase of the voltage of the measured combined receive signal, it indicates that the RF signals have canceled each other, and the corresponding scaling factor is set to capture the test conditions.

In block S313, P combined receive signals are measured at the output port 138 of the output combiner 130 according to P orthogonal test conditions. The P orthogonal test conditions may be represented as P orthogonal equations that are the linear sums of the P receiver products scaled by associated scaling factors $k_{n(xy)}$ and source voltages of the probe antennas, and the orthogonal test conditions are applied to the phased array antenna. In the depicted example, twelve measurements of combined receive signals are made since the number P of receiver products is 12.

For purposes of explanation, the first probe antenna 111 provides source voltage $S_1$ from the first signal source 151, the second probe antenna 112 provides source voltage $S_2$ from the second signal source 152, and the third probe antenna 113 provides source voltage $S_3$ from the third signal source 153. The voltage values that may be applied include S (predetermined voltage), 0 (no voltage) and S multiplied (scaled) by selected scaling factors $k_{n(xy)}$. The predetermined voltage S is a nominal value that may be selected for a number of practical reasons, such as the maximum voltage available from the first, second and third signal sources 151, 152 and 153, the expected path losses, and/or the sensitivity of the receiver channels, for example, as would be apparent to one skilled in the art. Accordingly, the combined receive signal is measured when applying each of the following sets of voltage values ($S_1, S_2, S_3$) to the first, second and third probe antennas 111, 112 and 113, respectively, to provide 12 orthogonal test conditions: (S,0,0), (0,S,0), (0,0,S), (S,$k_{1(12)}$S,0), (S,$k_{2(12)}$S,0), (S,$k_{3(12)}$S,0), (S,0,$k_{1(13)}$S), (S,0,$k_{2(13)}$S), (S,0,$k_{3(13)}$S), (0,S,$k_{1(23)}$S), (0,S,$k_{2(23)}$S), and (0,S,$k_{3(23)}$S).

In block S314, the P orthogonal equations are assembled in matrix form, as indicated by Equation (1):

$$S[K] \cdot X_{nm} G_n = R \qquad \text{Equation (1)}$$

Referring to Equation (1), S is the predetermined voltage value applied to M probe antennas, [K] is a P×P matrix of the $k_{n(xy)}$ scaling factors (voltages of the probe antennas normalized to the source voltage S) where P is the number of orthogonal test conditions, $X_{nm}G_n$ is a vector of P receiver products to be determined, and R is a measurement vector of P combined receive signal measurements.

In block S315, the receiver product vector $X_{nm}G_n$ is solved mathematically. This may be done by isolating the receiver product vector $X_{nm}G_n$ from Equation (1), which requires that the matrix [K] be invertible, to provide Equation (2):

$$X_{nm}G_n = 1/S[K]^{-1}R \qquad \text{Equation (2)}$$

The matrix [K] may be assembled based on various source voltages, including S, $Sk_{n(xy)}$ and 0, as discussed above with reference to block S313.

Figure 4:
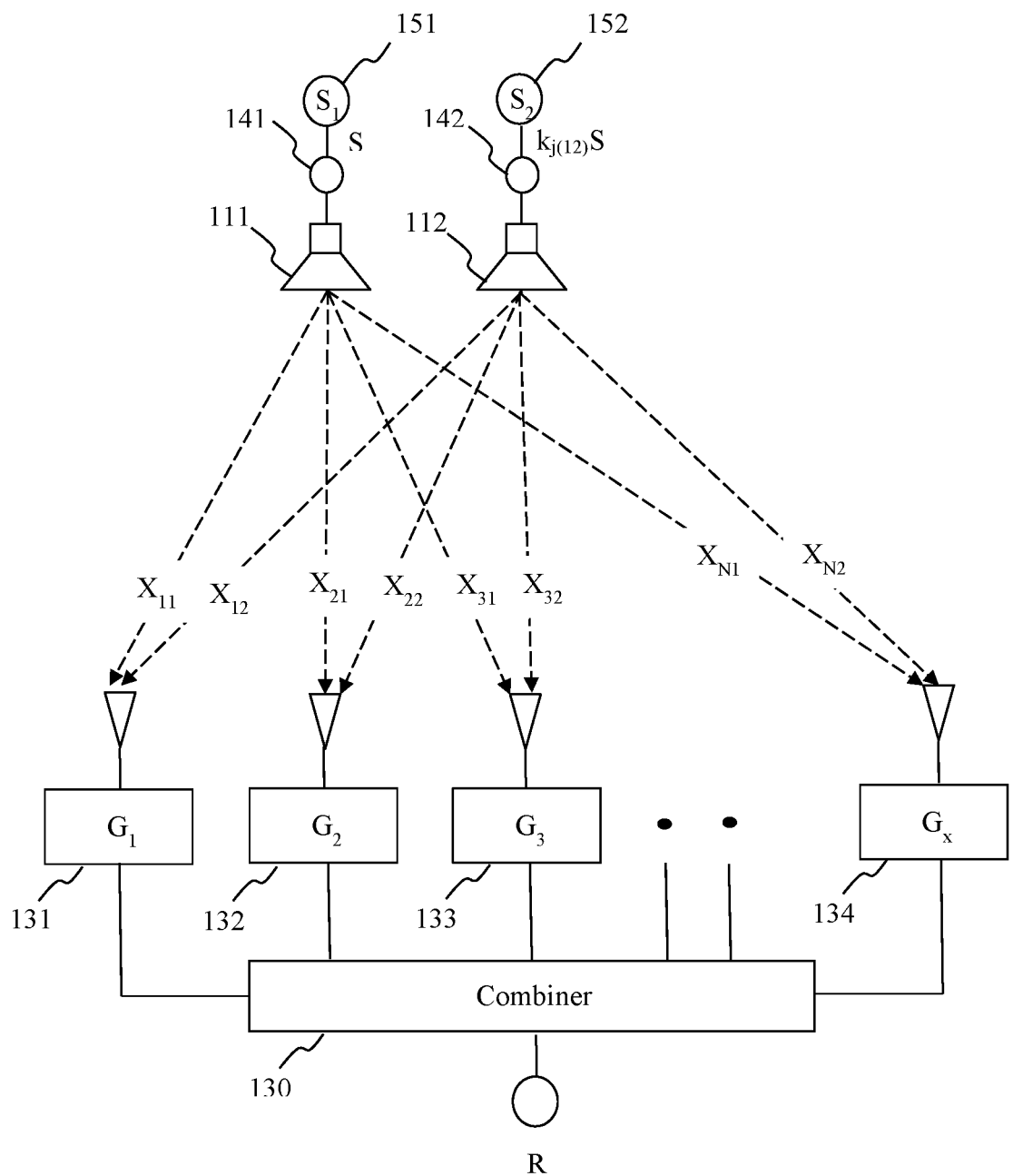
FIG. 4 is a simplified block diagram showing a portion of the test system for determining scaling factors to cancel RF signals from a stimulated pair of probe antennas arriving at particular channels of the phased array antenna, according to a representative embodiment.

FIG. 4 is a simplified block diagram showing a portion of the test system for determining scaling factors to cancel RF signals from a stimulated pair of probe antennas, according to a representative embodiment, as discussed above with reference to block S312.

Referring to FIG. 4, the stimulated pair of probe antennas is the first probe antenna 111 and the second probe antenna 112 in the depicted example. The first probe antenna 111 is shown connected to a first signal source 151 ($S_1$) and the second probe antenna 112 is shown connected to a second signal source 152 ($S_2$). Although FIG. 4 is directed to the stimulated pair of probe antennas including the first probe antenna 111 and the second probe antenna 112, it is understood that the other stimulated pairs of probe antennas including the first probe antenna 111 and the third probe antenna 113 and the second probe antenna 112 and the third probe antenna 113 function substantially the same with corresponding signal sources to determine additional scaling factors.

The RF signals from the first and second signal sources 151 and 152 are sent to the first, second, third and fourth receiver channels 131, 132, 133 and 134, where the fourth receiver channel is indicative of all remaining receiver channels of the N receiver channels in the phased array antenna 120 in addition to the original set of three receiver channels, as mentioned above. The RF signals output by the first, second, third and fourth receiver channels 131, 132, 133 and 134 are combined by the output combiner 130, which outputs combined receive signals (R) at the single output port 138. R is the measured value of the combined receive signal, indicated by Equation (3), where i is the number of a receiver channel (1, 2, 3 or X) and j is the number of the cancelled receiver channel:

$$R = \Sigma^i (SX_{i1} + k_{j(12)} SX_{i2}) G_i \qquad \text{Equation (3)}$$

Referring to Equation (3), S is the predetermined voltage applied to the first probe antenna 111 and $k_{j(12)}S$ is the predetermined voltage multiplied by the scaling factor $k_{j(12)}$, which provides an RF signal from the second probe antenna 112 to receiver channel j that cancels an RF signal from the first probe antenna 111 to receiver channel j. G is the complex gain of receiver channel i. So, for example, Equation (4) indicates the desired condition of FIG. 4, where j is the number of the receiver channel:

$$X_{j1} + k_{j(12)} X_{j2} = 0 \qquad \text{Equation (4)}$$

Equation (4) is applied to three receiver channels (first, second and third receiver channels 131, 132 and 133) using three different stimulated pairs of probe antennas (first and second probe antennas 111 and 112, first and third probe antennas 111 and 113, second and third probe antennas 112 and 113), respectively, to obtain the nine scaling factors $k_{n(xy)}$ identified above. Using these scaling factors, values of the combined receive signal R are measured for the various combinations of the scaling factors $k_{n(xy)}$ and the receiver products $X_{nm}G_n$ according to Equation (4), above.

In the example using three probe antennas (first, second and third probe antennas 111, 112 and 113), and consideration of a set of three receiver channels (first, second and third receiver channels 131, 132 and 133), each of the probe antennas is stimulated in turn with the source voltage S, while no voltages are applied to the other two probe antennas. Corresponding orthogonal equations associated with these test conditions are summarized with the following matrix notation, where the terms indicating complex gain $G_X$ (fourth receiver channel 134) account for the voltage contributions of the receiver channels not included in the set of three receiver channels:

$$\begin{bmatrix} 1 & 1 & 1 & 1 & 0 & 0 & 0 & 0 & 0 & 0 & 0 & 0 \\ 0 & 0 & 0 & 0 & 1 & 1 & 1 & 1 & 0 & 0 & 0 & 0 \\ 0 & 0 & 0 & 0 & 0 & 0 & 0 & 0 & 1 & 1 & 1 & 1 \end{bmatrix} \begin{bmatrix} X_{11}G_1 \\ X_{21}G_2 \\ X_{31}G_3 \\ X_{X1}G_X \\ X_{12}G_1 \\ X_{22}G_2 \\ X_{32}G_3 \\ X_{X2}G_X \\ X_{13}G_1 \\ X_{23}G_2 \\ X_{33}G_3 \\ X_{X3}G_X \end{bmatrix} = \begin{bmatrix} R(1) \\ R(2) \\ R(3) \end{bmatrix}$$

Next, for each of the nine orthogonal test conditions where the source voltages applied to the stimulated pairs of probe antennas are tuned to cancel the RF signals arriving at one specified receiver channel, no voltage is applied to the other probe antenna. Within the mathematical representation of each test condition, the scaling factors for the two cancelling product terms are set to zero to ensure the test condition is orthogonal to the three singly stimulated probe antenna conditions already determined. For example, for three probe antennas and consideration of three receiver channels, one test condition is obtained when the source voltage applied to the first probe antenna 111 is maintained at S and the source voltage applied to the second probe antenna 112 is $k_{1(12)}S$, such that the two RF signals arriving at the first receiver channel 131 cancel, as discussed above. Other test conditions are obtained by applying source voltage $k_{2(12)}S$ to the second probe antenna 112, such that the two RF signals arriving at the second receiver channel 132 cancel, and by applying the source voltage $k_{3(12)}S$ to the third probe antenna 113, such that the two RF signals arriving at the third receiver channel 133 cancel. These three orthogonal test conditions are summarized with the following matrix notation:

$$S \begin{bmatrix} 1 & 1 & 1 & 1 & k_{1(12)} & k_{1(12)} & k_{1(12)} & k_{1(12)} & 0 & 0 & 0 & 0 \\ 1 & 1 & 1 & 1 & k_{2(12)} & k_{2(12)} & k_{2(12)} & k_{2(12)} & 0 & 0 & 0 & 0 \\ 1 & 1 & 1 & 1 & k_{3(12)} & k_{3(12)} & k_{3(12)} & k_{3(12)} & 0 & 0 & 0 & 0 \end{bmatrix}$$

-continued $$\begin{bmatrix} X_{11}G_1 \\ X_{21}G_2 \\ X_{31}G_3 \\ X_{X1}G_X \\ X_{12}G_1 \\ X_{22}G_2 \\ X_{32}G_3 \\ X_{X2}G_X \\ X_{13}G_1 \\ X_{23}G_2 \\ X_{33}G_3 \\ X_{X3}G_X \end{bmatrix} = \begin{bmatrix} R(4) \\ R(5) \\ R(6) \end{bmatrix}$$

Referring to Equation (3), the cancellation terms in these conditions may be indicated as follows:

$$SX_{11}G_1 + k_{1(12)}SX_{12}G_1 = 0 \qquad \text{Equation (5A)}$$

$$SX_{21}G_2 + k_{2(12)}SX_{22}G_2 = 0 \qquad \text{Equation (5B)}$$

$$SX_{31}G_3 + k_{3(12)}SX_{32}G_3 = 0 \qquad \text{Equation (5C)}$$

Substituting zeros in the corresponding matrix entries for the scaling factors $k_{1(12)}$, $k_{2(12)}$ and $k_{3(12)}$, respectively, the matrix is rewritten as follows:

$$S\begin{bmatrix} 0 & 1 & 1 & 1 & 0 & k_{1(12)} & k_{1(12)} & k_{1(12)} & 0 & 0 & 0 & 0 \\ 1 & 0 & 1 & 1 & k_{2(12)} & 0 & k_{2(12)} & k_{2(12)} & 0 & 0 & 0 & 0 \\ 1 & 1 & 0 & 1 & k_{3(12)} & k_{3(12)} & 0 & k_{3(12)} & 0 & 0 & 0 & 0 \end{bmatrix}$$

$$\begin{bmatrix} X_{11}G_1 \\ X_{21}G_2 \\ X_{31}G_3 \\ X_{X1}G_X \\ X_{12}G_1 \\ X_{22}G_2 \\ X_{32}G_3 \\ X_{X2}G_X \\ X_{13}G_1 \\ X_{23}G_2 \\ X_{33}G_3 \\ X_{X3}G_X \end{bmatrix} = \begin{bmatrix} R(4) \\ R(5) \\ R(6) \end{bmatrix}$$

Other orthogonal test conditions are obtained by considering cancellations from the stimulated pair of the first probe antenna 111 and the third probe antenna 113 pair (applying $k_{1(13)}$, $k_{2(13)}$ and $k_{3(13)}$), and cancellations from the stimulated pair of the second probe antenna 112 and the third probe antenna 113 (applying $k_{1(23)}$, $k_{2(23)}$ and $k_{3(13)}$). Also, the final set of P (e.g., 12) orthogonal equations are assembled in matrix form (in block S314 of FIG. 3) by taking the M (e.g., 3) equations obtained from the stimulation of single probe antennas, and the P minus M (e.g., 9) equations obtained from the stimulation of pairs of probe antennas which result in voltage cancellation at the inputs to specified receiver channels.

In the example of three probe antennas and consideration of a subset of three receiver channels, the assembled orthogonal equations in matrix form of Equation (1) is as follows:

$$S\begin{bmatrix} 1 & 1 & 1 & 1 & 0 & 0 & 0 & 0 & 0 & 0 & 0 & 0 \\ 0 & 0 & 0 & 0 & 1 & 1 & 1 & 1 & 0 & 0 & 0 & 0 \\ 0 & 0 & 0 & 0 & 0 & 0 & 0 & 0 & 1 & 1 & 1 & 1 \\ 0 & 1 & 1 & 1 & 0 & k_{1(12)} & k_{1(12)} & k_{1(12)} & 0 & 0 & 0 & 0 \\ 1 & 0 & 1 & 1 & k_{2(12)} & 0 & k_{2(12)} & k_{2(12)} & 0 & 0 & 0 & 0 \\ 1 & 1 & 0 & 1 & k_{3(12)} & k_{3(12)} & 0 & k_{3(12)} & 0 & 0 & 0 & 0 \\ 0 & 1 & 1 & 1 & 0 & 0 & 0 & 0 & 0 & k_{1(13)} & k_{1(13)} & k_{1(13)} \\ 1 & 0 & 1 & 1 & 0 & 0 & 0 & 0 & k_{2(13)} & 0 & k_{2(13)} & k_{2(13)} \\ 1 & 1 & 0 & 1 & 0 & 0 & 0 & 0 & k_{3(13)} & k_{3(13)} & 0 & k_{3(13)} \\ 0 & 0 & 0 & 0 & 0 & 1 & 1 & 1 & 0 & k_{1(23)} & k_{1(23)} & k_{1(23)} \\ 0 & 0 & 0 & 0 & 1 & 0 & 1 & 1 & k_{2(23)} & 0 & k_{2(23)} & k_{2(23)} \\ 0 & 0 & 0 & 0 & 1 & 1 & 0 & 1 & k_{3(23)} & k_{3(23)} & 0 & k_{3(23)} \end{bmatrix}$$

$$\begin{bmatrix} X_{11}G_1 \\ X_{21}G_2 \\ X_{31}G_3 \\ X_{X1}G_X \\ X_{12}G_1 \\ X_{22}G_2 \\ X_{32}G_3 \\ X_{X2}G_X \\ X_{13}G_1 \\ X_{23}G_2 \\ X_{33}G_3 \\ X_{X3}G_X \end{bmatrix} = \begin{bmatrix} R(1) \\ R(2) \\ R(3) \\ R(4) \\ R(5) \\ R(6) \\ R(7) \\ R(8) \\ R(9) \\ R(10) \\ R(11) \\ R(12) \end{bmatrix}$$

The placement of the zeros substituted for selected scaling factors $k_{n(xy)}$ in the matrix [K] make the matrix [K] invertible, as discussed above. Therefore, the matrix form of Equation (2), for isolating the vector of P receiver products $X_{nm}G_n$ is as follows:

$$\begin{bmatrix} X_{11}G_1 \\ X_{21}G_2 \\ X_{31}G_3 \\ X_{X1}G_X \\ X_{12}G_1 \\ X_{22}G_2 \\ X_{32}G_3 \\ X_{X2}G_X \\ X_{13}G_1 \\ X_{23}G_2 \\ X_{33}G_3 \\ X_{X3}G_X \end{bmatrix} =$$

$$\frac{1}{S}\begin{bmatrix} 1 & 1 & 1 & 1 & 0 & 0 & 0 & 0 & 0 & 0 & 0 & 0 \\ 0 & 0 & 0 & 0 & 1 & 1 & 1 & 1 & 0 & 0 & 0 & 0 \\ 0 & 0 & 0 & 0 & 0 & 0 & 0 & 0 & 1 & 1 & 1 & 1 \\ 0 & 1 & 1 & 1 & 0 & k_{1(12)} & k_{1(12)} & k_{1(12)} & 0 & 0 & 0 & 0 \\ 1 & 0 & 1 & 1 & k_{2(12)} & 0 & k_{2(12)} & k_{2(12)} & 0 & 0 & 0 & 0 \\ 1 & 1 & 0 & 1 & k_{3(12)} & k_{3(12)} & 0 & k_{3(12)} & 0 & 0 & 0 & 0 \\ 0 & 1 & 1 & 1 & 0 & 0 & 0 & 0 & 0 & k_{1(13)} & k_{1(13)} & k_{1(13)} \\ 1 & 0 & 1 & 1 & 0 & 0 & 0 & 0 & k_{2(13)} & 0 & k_{2(13)} & k_{2(13)} \\ 1 & 1 & 0 & 1 & 0 & 0 & 0 & 0 & k_{3(13)} & k_{3(13)} & 0 & k_{3(13)} \\ 0 & 0 & 0 & 0 & 0 & 1 & 1 & 1 & 0 & k_{1(23)} & k_{1(23)} & k_{1(23)} \\ 0 & 0 & 0 & 0 & 1 & 0 & 1 & 1 & k_{2(23)} & 0 & k_{2(23)} & k_{2(23)} \\ 0 & 0 & 0 & 0 & 1 & 1 & 0 & 1 & k_{3(23)} & k_{3(23)} & 0 & k_{3(23)} \end{bmatrix}^{-1}$$

$$\begin{bmatrix} R(1) \\ R(2) \\ R(3) \\ R(4) \\ R(5) \\ R(6) \\ R(7) \\ R(8) \\ R(9) \\ R(10) \\ R(11) \\ R(12) \end{bmatrix}$$

Referring again to FIG. 2, once the receiver products $X_{11}G_1$, $X_{12}G_1$, $X_{13}G_1$, $X_{21}G_2$, $X_{22}G_2$, $X_{23}G_2$, $X_{31}G_3$, $X_{32}G_3$, $X_{33}G_3$ are isolated in block S213 from the measured combined receive signals, a relative value is determined in block S214 between complex gain of at least one receiver channel of the first, second and third receiver channels 131, 132 and 133 at the selected complex gain setting (e.g., second complex gain setting) and a previous complex gain of the same at least one receiver channel at a previous or reference selected complex gain setting (e.g., first complex gain setting) using the isolated receiver products from block S213, where previous receiver products have been determined at the previous selected complex gain setting in the same manner described above.

For example, assuming for purposes of illustration that the difference in complex gains is to be determined for the first receiver channel 131, a first (previous) complex gain setting is established by the user for the first receiver channel 131. The complex gain settings may be established by electronic and/or mechanical controls on or otherwise supported by the phased array antenna 120, for example, as would be known to one skilled in the art. An isolated first receiver product for the first complex gain setting is determined, in the manner discussed above. A second (current) complex gain setting is established for the first receiver channel 131, and an isolated second receiver product for the second complex gain setting is determined, also in the manner discussed above. A ratio between the isolated first receiver product for the first complex gain setting and the isolated second receiver product for the second complex gain setting is then determined. The complex path losses of each of the isolated first and second receiver products cancel out in the ratio. Therefore, the ratio indicates the difference between the first complex gain and the second complex gain of the first receiver channel 131 resulting from the change from the first complex gain setting to the second complex gain setting. The difference between the first and second complex gains should be consistent with the first and second complex gain settings of the first receiver channel 131.

In an embodiment, the amplitude and phase of the complex gain of the at least one receiver channel may be established and/or analyzed separately. For example, the complex gain settings of the first, second and third receiver channels 131, 132 and 133 may include separate amplitude and phase settings. Accordingly, determining the relative value of the complex gains would include determining a first relative value between the gain amplitude of the at least one receiver channel at the selected amplitude setting and a previous gain amplitude of the at least one receiver channel at a previous selected amplitude setting using the isolated receiver products. Likewise, determining a second relative value between the gain phase of the at least one receiver channel at the selected phase setting and a previous gain phase of the at least one receiver channel at a previous selected phase setting using the isolated receiver products. This may provide more detailed information as to what may cause unexpected differences between the first and second complex gains. Similarly, even where the complex gain settings do not include separate amplitude and phase settings, the relative value of the complex gains may still be determined using first and second relative values between the gain amplitude and the gain phase of the at least one receiver channel.

Of course, relative values between complex gains of receiver channels other than the first receiver channel 131 may be determined in the same manner. Also, the relative values between complex gains of more than one receiver channel may be determined in the same manner at substantially the same time.

In block S215, it is determined whether the at least one receiver channel for which the relative value of complex gains has been determined is functioning properly. This may be done by comparing the determined relative value of the complex gains (e.g., the ratio indicating the difference between the first complex gain and the second complex gain) with a ratio of expected complex gains corresponding to the first and second complex gain settings of the at least one receiver channel. This may be done, for example, by dividing the gain amplitude setting by the previous gain amplitude setting, and subtracting the previous gain phase setting from the gain phase setting to determine the ratio of the two complex gain settings. That is, the two complex gain states for the first receiver channel 131 may be represented as $G_{1(1)} = g_{1(1)}e^{j\theta_{1(1)}}$ for first complex gain setting and $G_{1(2)} = g_{1(2)}e^{j\theta_{1(2)}}$ for the second complex gain setting, where $g_{1(1)}$ and $g_{1(2)}$ are the two gain amplitude states of the first receiver channel 131, and $\theta_{1(1)}$ and $\theta_{1(2)}$ are the two gain phase states. The ratio is therefore provided by Equation (6):

$$\frac{G_{1(2)}}{G_{1(1)}} = \frac{g_{1(2)}}{g_{1(2)}} e^{j(\theta_{1(2)} - \theta_{1(1)})} \qquad \text{Equation (6)}$$

When the ratio of the determined complex gains is substantially the same as the ratio of expected complex gains from the complex gain settings determined according to Equation (6), the at least one receiver channel is determined to be functioning properly.

Determinations of whether each of the first, second and third receiver channels 131, 132 and 133 is functioning properly are useful in determining the quality of the phased array antenna, as a finished product or during fabrication and/or testing. For example, when one of the first, second and third receiver channels 131, 132 and 133 has ratio of complex gains that departs from the expected ratio based on the complex gain settings, that receiver channel may be adjusted, or removed and replaced, independently of the other receiver channels.

Also, before use, an AUT must be calibrated. That is, relative gain amplitudes and phase shifts within a receiver channel and between receiver channels must be determined. Therefore, obtaining ratios between complex gains within each receiver channel constitutes a partial calibration of the AUT with respect to the relative gain and phase shifts within a receiver channel. This partial or initial calibration may be the used to reduce calibration time during subsequent calibration in a far-field range or a CATR for determining the gain amplitudes and phase shifts between the receiver channels.

In an embodiment, the complex gain and complex loss products are isolated for RF signals transmitted by transmitter channels in an AUT, as opposed to RF signals being received by receiver channels in the AUT. Isolating the complex gain and complex loss products is useful in identifying defective transmitter channels, for example, by comparing the isolated complex gain and complex loss products with expected complex gain and complex loss products associated with complex gain settings of the transmitter channel.

Figure 5:
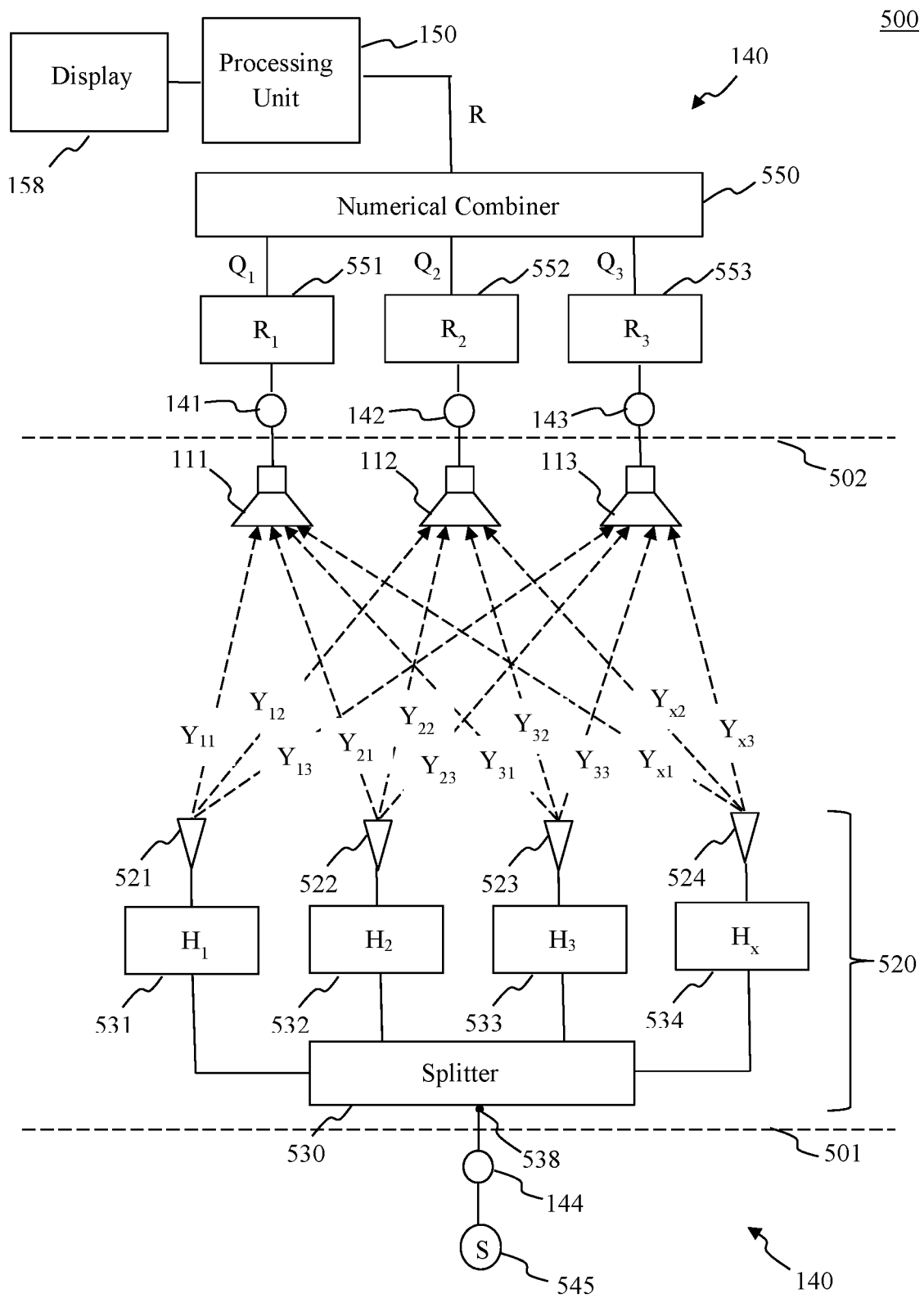
FIG. 5 is a simplified block diagram showing a test system for isolating individual transmitter channels of a phased array antenna, according to a representative embodiment.

FIG. 5 is a simplified block diagram showing a test system for isolating individual transmitter channels of a phased array antenna, according to a representative embodiment. Generally, there is symmetry of operation, meaning that the same procedures developed for testing the AUT in a receive mode may be applied to testing the AUT in a transmit mode. Also, the test system for isolating transmitter channels of a phased array antenna may be the same as the test system for isolating receiver channels of the same phased array antenna, or the test systems for isolating transmitter and receiver channels may be separate, dedicated test systems, without departing from the scope of the present teachings. In the discussion below, it is assumed that the components are in addition to the components of the same test system discussed above, such that one test system may be used for isolating transmitter and receiver channels.

Referring to FIG. 5, a test system 500 is shown configured to receive RF signals that are transmitted by the phased array antenna 520 of an AUT including a splitter 530 with a single input port 538. The phased array antenna 520 may be the same as the phased array antenna 120, including the same components discussed above. The test system 500 includes the measurement instrument 140, which additionally includes a first receiver 551, a second receiver 552 and a third receiver 553, a numerical combiner 550 for combining (scaled) outputs of the first, second and third receivers 551, 552 and 553, and a signal source 545 (source voltage S) for generating transmit signals connected to the input port 538 of the phase array antenna 520. The measurement instrument 140 further includes or is otherwise connected to the processing unit 150 and the display 158 discussed above. The processing unit 150 may be connected to the numerical combiner 550 to receive a combined transmit signal received by at least one of the first, second and third receivers 551, 552 and 553. The processing unit 150 may also be connected to the signal source 545 to control the generating the transmit signal to be provided to the phased array antenna 520. Also, although depicted separately, the numerical combiner 550 may be implemented by the processing unit 150.

In the depicted embodiment, the first port 141 of the measurement instrument 140 is connected to the first probe antenna 111, the second port 142 is connected to the second probe antenna 112, and the third port 143 is connected to the third probe antenna 113 for receiving RF signals transmitted by the phased array antenna 520. The fourth port 144 is connected to the single input port 538 of the splitter 530 for providing a transmit signal generated by the signal source 545 to the phased array antenna 520, although the transmit signal may be generated by a signal source separate from the measurement instrument 140, without departing from the scope of the present teachings.

The phased array antenna 520 includes multiple antenna elements arranged in a fixed pattern in relation to one another, and corresponding transmit channels, for sending the RF signals to the first, second and third probe antennas 111, 112 and 113. In the depicted embodiment, the phased array antenna 520 includes a first antenna element 521 connected to a first transmitter channel 531, a second antenna element 522 connected to a second transmitter channel 532, and a third antenna element 523 connected to a third transmitter channel 533. In an embodiment, the first, second and third antenna elements 521, 522 and 523 may be the same as the first, second and third antenna elements 121, 122 and 123 when the same antenna elements are configured to transmit and receive RF signals.

The splitter 530 is configured to split the transmit signal generated by the signal source 545 to provide to the transmit channels and the antenna elements of phased array antenna 520 into separate RF transmit signals. Like the phased array antenna 120, the phased array antenna 520 may have an arbitrary number of antenna elements and transmit channels, but they are measured in groups of three according to a representative embodiment. Accordingly, the three antenna elements to be measured as shown in FIG. 5 are the first, second and third antenna elements 521, 522 and 523. A fourth antenna element 524 represents all other antenna elements that may be included in the phased array antenna 520 and connected to the splitter 530. Thus, the fourth antenna element 524 is not directly part of the measurement discussed below, but is included as a noise term. In an alternative embodiment, the phased array antenna 520 has two antenna elements (e.g., first and second antenna elements 521 and 522) and the test system 500 has two probe antennas (e.g., first and second probe antennas 111 and 112). At least the phased array antenna 520 is included within the anechoic chamber with the first, second and third probe antennas 111, 112 and 113.

A first reference plane 501 is shown at the fourth port 144 of the measurement instrument 140 for measuring the transmitted signals at the single splitter input port 538 of the AUT. A second reference plane 502 is shown at the first, second and third ports 141, 142 and 143 of the measurement instrument 140 for measuring received signals at the first, second and third probe antennas 111, 112 and 113.

FIG. 5 further shows RF signal propagation paths from each of the first, second and third antenna elements 521, 522 and 523 of the phased array antenna 520 to each of the first, second and third probe antennas 111, 112 and 113. Antenna reciprocity is not assumed because the antenna gain patterns may be dependent on match, which may be different for transmitting and receiving RF signals. Therefore, the propagation paths for transmitting RF signals are designated by Y-terms to distinguish them from the X-terms used for receiving RF signals. That is, $Y_{nm}$ indicates the complex path loss (amplitude and phase) of the propagation paths, where n is the number of the antenna element of the phased array antenna 520 transmitting the RF signal and m is the number of the probe antenna receiving the RF signal on the corresponding propagation path. Accordingly, the first antenna element 521 transmits RF signals to the first, second and third probe antennas 111, 112 and 113 on propagation paths having complex path losses $Y_{11}$, $Y_{12}$ and $Y_{13}$ respectively, the second antenna element 522 transmits RF signals to the first, second and third probe antennas 111, 112 and 113 on propagation paths having complex path losses $Y_{21}$, $Y_{22}$ and $Y_{23}$ respectively, and the third antenna element 523 transmits RF signals to the first, second and third probe antennas 111, 112 and 113 on propagation paths having complex path losses $Y_{31}$, $Y_{32}$ and $Y_{33}$ respectively.

Further, for purposes of discussion, $H_n$ indicates the complex gain (amplitude and phase) of each of the first, second and third transmitter channels 531, 532 and 533, where the number n of the transmitter channel is the same as the corresponding antenna element. The transmitter channel complex gain, as well as any losses in the corresponding antenna element feeds, are included in the $H_n$ terms. Each of the first, second and third transmitter channels 531, 532 and 533 has multiple available complex gain settings that are adjustable by a user to accommodate testing. The complex gain of the notional fourth transmitter channel is indicated as $H_x$, which represents all other transmitter channels of the phased array antenna 520 in addition to the first, second and third transmitter channels 531, 532 and 533.

Therefore, the RF signals output from each of the first, second and third transmitter channels 531, 532 and 533 may be represented by a set of products of the complex path losses and the complex gain $H_n Y_{nm}$ (referred to as "transmitter products"). So, the output of the first transmitter channel 531 is represented by the transmitter products $H_1 Y_{11}$, $H_1 Y_{12}$ and $H_1 Y_{13}$, the output of the second transmitter channel 532 is represented by the transmitter products $H_2 Y_{21}$, $H_2 Y_{22}$ and $H_2 Y_{23}$, and the output of the third transmitter channel 533 is represented by the transmitter products $H_3 Y_{31}$, $H_3 Y_{32}$ and $H_3 Y_{33}$. The respective complex gains are useful in determining whether the first, second and third transmitter channels 531, 532 and 533 are functioning properly. However, because the RF signals transmitted by the first, second and third transmitter channels 531, 532 and 533 and the notional transmitter channel 534 are received by each of the first, second and third receivers 551, 552 and 553, the individual respective complex gains are not readily identifiable. Therefore, the transmitter products $H_n Y_{nm}$ and subsequently the complex gain terms $H_n$ must first be isolated, as described below.

Figure 6:
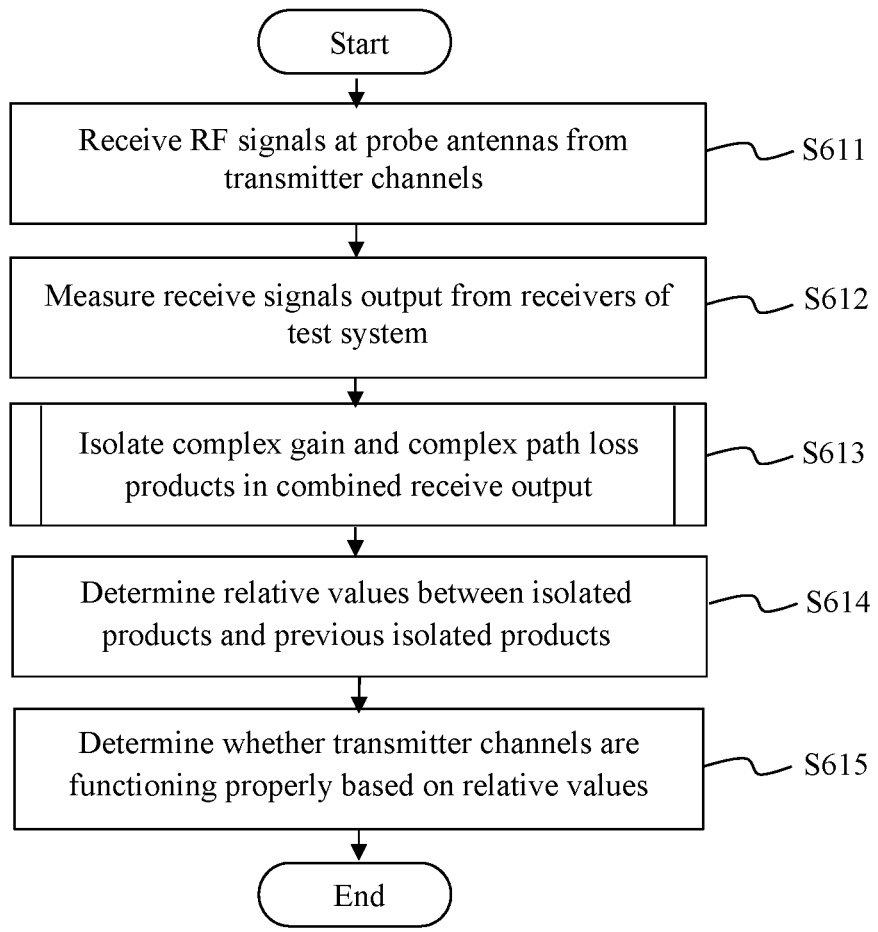
FIG. 6 is a simplified flow diagram depicting a method of performing transmitter tests of a phased array antenna with multiple OTA transmitter channels, according to a representative embodiment.

FIG. 6 is a simplified flow diagram depicting a method of performing transmitter tests of a phased array antenna with multiple OTA transmitter channels, according to a representative embodiment.

Generally, in the depicted example, the objective is to determine the twelve transmitter product unknowns $H_1 Y_{11}$, $H_1 Y_{12}$, $H_1 Y_{13}$, $H_2 Y_{21}$, $H_2 Y_{22}$, $H_2 Y_{23}$, $H_3 Y_{31}$, $H_3 Y_{32}$, $H_3 Y_{33}$, $H_X Y_{X1}$, $H_X Y_{X2}$ and $H_X Y_{X3}$ of the test system 500. These quantities are measured as their sum retrieved from a combined receive signal output by at the numerical combiner 550. The number of probe antennas of the test system 100 and the number of receiver channels of the phased array antenna 120 in FIG. 1 are illustrative, and may vary, provided there are at least two probe antennas and at least two receiver channels, to provide unique benefits for any particular situation or to meet application specific design requirements of various implementations, as would be apparent to one skilled in the art.

Referring to FIG. 6, at block S611, RF signals transmitted by the first, second and third transmitter channels 531, 532 and 533 are received by each of the first, second, and third receivers 551, 552 and 553 through the first, second, and third probe antennas 111, 112 and 113 over the corresponding propagation paths, respectively. Each of the first, second, and third receivers 551, 552 and 553 also receive RF signals transmitted by the notional fourth transmitter channel 534. In order to provide the RF signals transmitted by the first, second and third transmitter channels 531, 532 and 533, the signal source 545 (source voltage S) of the test system 500 provides a transmit signal to the splitter 530 through the fourth port 144. The splitter 530 splits the transmit signal among the first, second and third transmitter channels 531, 532 and 533 (as well as any additional transmitter channels represented by the notional transmitter channel 534) to be transmitted as the RF signals. Each of the first, second and third transmitter channels 531, 532 and 533 is set at a selected complex gain setting of the multiple available complex gain settings, where each of the available complex gain settings selects a corresponding gain and phase.

At block S612, the received RF signals are measured at the first, second and third receivers 551, 552 and 553. The first receiver 551 outputs a first measured received signal having first receiver voltage $R_1$, the second receiver 552 outputs a second measured received signal having second receiver voltage $R_2$, and the third receiver 553 outputs a third measured received signal having third receiver voltage $R_3$. Accordingly, the first, second and third receiver voltages R1, R2 and R3 of the measured receive signals may be indicated as follows:

$$R_1 = S(H_1 Y_{11} + H_2 Y_{21} + H_3 Y_{31} + H_X Y_{X1}) \quad \text{Equation (7A)}$$

$$R_2 = S(H_1 Y_{12} + H_2 Y_{22} + H_3 Y_{32} + H_X Y_{X2}) \quad \text{Equation (7B)}$$

$$R_3 = S(H_1 Y_{13} + H_2 Y_{23} + H_3 Y_{33} + H_X Y_{X3}) \quad \text{Equation (7C)}$$

The transmitter products ($H_1 Y_{11}$, $H_1 Y_{12}$, $H_1 Y_{13}$, $H_2 Y_{21}$, $H_2 Y_{22}$, $H_2 Y_{23}$, $H_3 Y_{31}$, $H_3 Y_{32}$, $H_3 Y_{33}$, $H_X Y_{X1}$, $H_X Y_{X2}$ and $H_X Y_{X3}$) are then isolated in the process indicated by block S613. The transmitter products correspond to products of the complex gain ($H_n$) and the complex path losses ($Y_{nm}$) at each of the first, second and third transmitter channels 531, 532 and 533.

For the reasons discussed above with regard to isolating the transmitter products, twelve orthogonal test conditions need to be identified in the depicted embodiment in order to develop a system of twelve orthogonal equations for determining the twelve transmitter product unknowns. Generally, the first, second and third receivers 551, 552 and 553 are turned on one at a time, while the other two are off, thereby supplying three orthogonal test conditions. Also, pairs of the first, second and third receivers 551, 552 and 553 are turned on under conditions such that the RF signals transmitted by one of the first, second and third transmitter channels 531, 532 and 533 to the pair of receivers are canceled by applying an appropriate amplitude/phase receive scaling factor (q-factor). These cancellations at each pair of the receivers for each of the first, second and third transmitter channels 531, 532 and 533 provide corresponding orthogonal test conditions, thereby supplying nine additional orthogonal test conditions, for a total of twelve. The receive scaling factors for the pairs of receivers are determined using pre-tuning measurements that take advantage of the fact that when cancellation of the RF signals occurs, the output from the numerical combiner 550 is independent of the complex gain setting of the transmitter channel involved, and therefore does not change, as discussed below.

Figure 7:
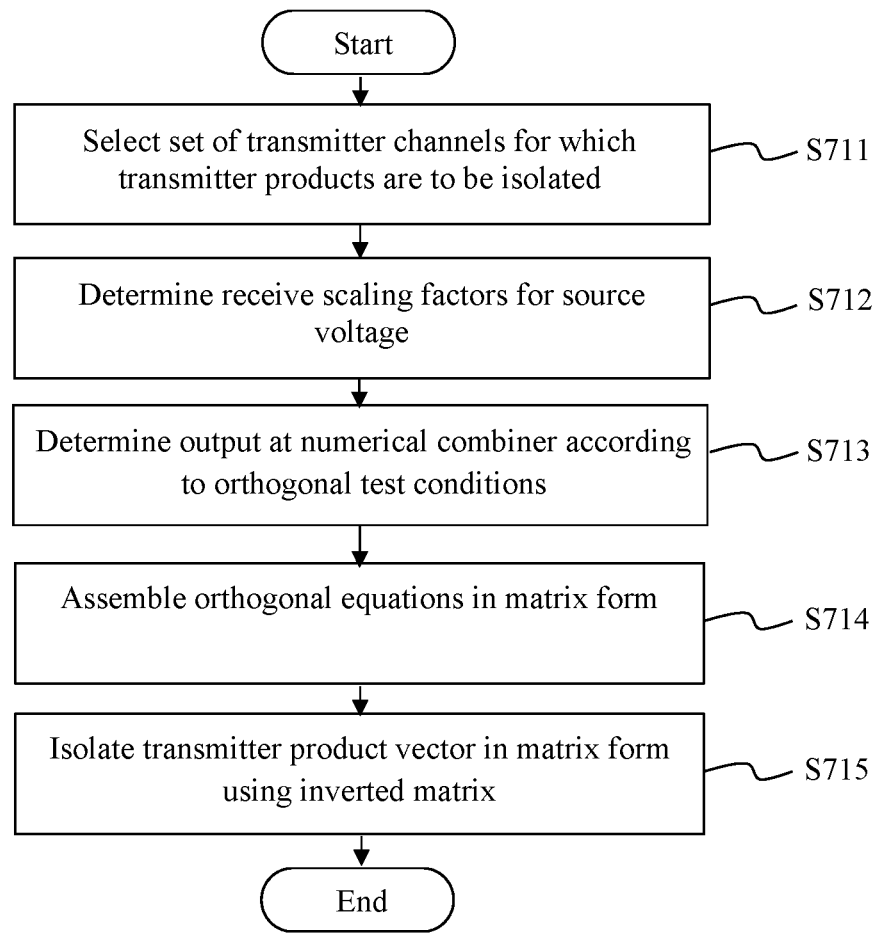
FIG. 7 is a simplified flow diagram depicting a method of isolating the transmitter products of the transmitter channels, according to a representative embodiment.

FIG. 7 is a simplified flow diagram depicting a method of isolating the transmitter products of the transmitter channels in block S613, according to a representative embodiment.

Referring to FIG. 7, in block S711, a set of transmitter channels is selected for which the transmitter products are to be isolated. The selected set of transmitter channels may include all transmitter channels ($N_O$) of the phased array antenna, or some number of transmitter channels (N) less than all transmitter channels of the phased array antenna. At a minimum, there will be two probe antennas and two transmitter channels. When the selected set of transmitter channels includes $N_O$ transmitter channels, the number P of transmitter products to be isolated for M probe antennas is M*N₀. When selected set of transmitter channels includes N receiver channels (less than $N_0$), the number P of transmitter products to be determined for M probe antennas is M(N+1). In the example depicted in FIG. 5, there are three probe antennas (first, second and third probe antennas 111, 112 and 113), four transmitter channels (first, second, and third receiver channels 531, 532 and 533 and the notional fourth transmitter channel 534) and three transmitter channels (first, second and third transmitter channels 531, 532 and 533) in the selected set of transmitter channels. So, M=3, $N_0$=4 or greater, N=3, and the number P of transmitter products to be determined is 3(3+1), or 12.

Accordingly, when there are three transmitter channels under consideration, there will be 12 measurements, i.e., four measurements per transmitter channel. In other embodiments, there may be more than three transmitter channels in the consideration. For example, using three probe antennas, when four transmitter channels are considered (plus the notional transmitter channel to account for additional channels of the phased array antenna not in the consideration), there would be 3(4+1)=15 transmitter products to determine or 15 measurements to make, which is 3.75 measurements per transmitter channel. As the number of transmitter channels in the consideration increases, the measurements per transmitter channel tends toward three measurements per transmitter channel. So, it is the case generally that, as the number of channels in the consideration increases, the fewer measurements need to be made to completely characterize all transmitter channels in the AUT, although the computational load increases, as discussed above.

In block S712, receiver scaling factors $q_{n(xy)}$ (q-factors) are determined from P minus M pre-tuning measurements, which in the present example is nine. In particular, the scaling factor may be determined using three different pairs of the first, second and third receivers 551, 552 and 553 and corresponding first, second and third probe antennas 111, 112 and 113, respectively, where when one pair of receivers is on or otherwise activated, the remaining receiver is off or deactivated. This results in activated pairs of receivers from among the first, second and third receivers 551, 552 and 553. Each scaling factor $q_{n(xy)}$, when applied between the pairs of receivers, cancels the RF signals transmitted by a particular transmitter channel to the activated pair of receivers, where n is the one transmitter channel of the first, second and third transmitter channels 531, 532 and 533 at which the transmitted RF signals are cancelled, and xy is the activated pair of receivers. Using this nomenclature, the scaling factors for the nine combinations of transmitter channels and activated pairs of receivers are as follows:

$q_{1(12)}$ is the scaling factor that cancels RF signals transmitted by the first transmitter channel 531 and received at the first and second receivers 551 and 552;

$q_{2(12)}$ is the scaling factor that cancels RF signals transmitted by the second transmitter channel 532 and received at the first and second receivers 551 and 552;

$q_{3(12)}$ is the scaling factor that cancels RF signals transmitted by the third transmitter channel 533 and received at the first and second receivers 551 and 552;

$q_{1(13)}$ is the scaling factor that cancels RF signals transmitted by the first transmitter channel 531 and received at the first and third receivers 551 and 553;

$q_{2(13)}$ is the scaling factor that cancels RF signals transmitted by the second transmitter channel 532 and received at the first and third receivers 551 and 553;

$q_{3(13)}$ is the scaling factor that cancels RF signals transmitted by the third transmitter channel 533 and received at the first and third receivers 551 and 553;

$q_{1(23)}$ is the scaling factor that cancels RF signals transmitted by the first transmitter channel 531 and received at the second and third receivers 552 and 553;

$q_{2(23)}$ is the scaling factor that cancels RF signals transmitted by the second transmitter channel 532 and received at the second and third receivers 552 and 553; and $q_{3(23)}$ is the scaling factor that cancels RF signals transmitted by the third transmitter channel 533 and received at the second and third receivers 552 and 553.

In an embodiment, determining the scaling factors that cause the RF signals transmitted by one of the transmitter channels and received at activated pairs of receivers may be determined empirically. For example, one of the first, second and third transmitter channels 531, 532 and 533 transmitting RF signals, being received by the activated pair of receivers, is considered at a time. A complex scaling factor applied to the numerical output of one of the receivers from the activated pair of receivers is tuned until the RF signals from the transmitter channel under consideration cancel at the output of the numerical combiner 550. RF signals from the other transmit channels also arrive at the activated pair of receivers. However, at the point of cancellation of the RF signals from the transmitter channel under consideration, the calculated voltage at the output of the numerical combiner 550 will be independent of the complex gain for that transmitter channel under consideration. Therefore, the cancellation of the RF signals may be identified by monitoring the combined output of the numerical combiner 550 while changing the complex gain of the transmitter channel under consideration and keeping the complex gains of the other transmitter channels fixed. When changing the complex gain does not change the amplitude or the phase of the voltage of the combined output of the numerical combiner 550, it indicates that the RF signals received at the activated pair of receivers from the transmitter channel under consideration have canceled each other, and the corresponding scaling factor is set to capture the test conditions.

In block S713, P combined outputs are determined at the numerical combiner 550 according to P orthogonal test conditions. The P orthogonal test conditions may be represented as P orthogonal equations that are the linear sums of the P transmitter products scaled by associated scaling factors $q_{n(xy)}$ and the source voltage S of the signal source 545. In the depicted example, determinations of twelve combined receive outputs are made since the number P of receiver products is 12.

The combined output at the numerical combiner 550 is the sum of the measured first, second and third receiver voltages $R_1$, $R_2$ and $R_3$ scaled by corresponding complex scaling factors $Q_1$, $Q_2$ and $Q_3$, respectively, as indicated by Equation (8):

$$R = Q_1 R_1 + C Q_2 R_2 + Q_3 R_3 \qquad \text{Equation (8)}$$

The combinations of the complex scaling factors ($Q_1$, $Q_2$, $Q_3$) define the orthogonal test conditions: (1,0,0), (0,1,0), (0,0,1), (1,$q_{1(12)}$,0), (1,$q_{2(12)}$,0), (1,$q_{3(12)}$,0), (1,0,$q_{1(13)}$), (1,0,$q_{2(13)}$), (1,0,$q_{3(13)}$), (0, 1,$q_{1(23)}$), (0, 1,$q_{2(23)}$), and (0,1, $q_{3(23)}$).

In block S714, the P orthogonal equations are assembled in matrix form, as indicated by Equation (9):

$$S[Q]H_n Y_{nm} = R \qquad \text{Equation (9)}$$

Referring to Equation (9), S is the predetermined voltage value applied by the signal source 545 to the splitter 530, [Q] is a P×P matrix of the $q_{n(xy)}$ scaling factors where P is the number of orthogonal test conditions, $H_n Y_{nm}$ is a vector of P transmitter products to be determined, and R is a measurement vector of P combined receive output determinations from the numerical combiner 550. More particularly, with regard to the matrix [Q], $q_{n(xy)}$ are the scaling factors applied to the outputs of the first, second and third receivers 551, 552 and 553 respectively connected to the first, second and third probe antennas 111, 112 and 113 normalized to a scaling factor of 1 applied to an output of a first receiver 551. The predetermined voltage S is a nominal value that may be selected for a number of practical reasons, such as the maximum voltage, the expected path losses, and/or the sensitivity of the receivers, for example, as would be apparent to one skilled in the art.

In block S715, the transmitter product vector $H_n Y_{nm}$ is solved mathematically. This may be done by isolating the transmitter product vector $H_n Y_{nm}$ from Equation (9), which requires that the matrix [Q] be invertible to provide Equation (10):

$$H_n Y_{nm} = 1/S[Q]^{-1} R \qquad \text{Equation (10)}$$

In matrix form, making measurements at only one of the first, second and third receivers 551, 552 and 553 at a time with the other two receivers turned off provides three orthogonal test conditions, represented as follows:

$$S \begin{bmatrix} 1 & 1 & 1 & 1 & 0 & 0 & 0 & 0 & 0 & 0 & 0 & 0 \\ 0 & 0 & 0 & 0 & 1 & 1 & 1 & 1 & 0 & 0 & 0 & 0 \\ 0 & 0 & 0 & 0 & 0 & 0 & 0 & 0 & 1 & 1 & 1 & 1 \end{bmatrix} \begin{bmatrix} H_1 Y_{11} \\ H_2 Y_{21} \\ H_3 Y_{31} \\ H_X Y_{X1} \\ H_1 Y_{12} \\ H_2 Y_{22} \\ H_3 Y_{32} \\ H_X Y_{X2} \\ H_1 Y_{13} \\ H_2 Y_{23} \\ H_3 Y_{33} \\ H_X Y_{X3} \end{bmatrix} = \begin{bmatrix} R(1) \\ R(2) \\ R(3) \end{bmatrix}$$

The remaining nine orthogonal test conditions are obtained using activated pairs of receivers and corresponding pairs of probe antennas, as discussed above. For each activated pair of receivers, scaling factors $q_{n(xy)}$ are obtained that cancel the RF signals transmitted from each of the first, second and third transmitter channels 531, 532 and 533 in turn. Within the mathematical representation of each orthogonal test condition, the scaling factors for the two cancelling product terms are set to zero to ensure the test condition is orthogonal to the three singly activated receiver antenna conditions already determined. For example, for three probe antennas and consideration of three transmitter channels, where the activated pair of receivers is the first receiver 551 and the second receiver 552, one test condition is obtained when the first receiver voltage $R_1$ is maintained at 1 and the second receiver voltage $R_2$ is set to $q_{1(12)}$, such that the two RF signals arriving at the first and second receivers 551 and 552 from the first transmitter channel 531 cancel, as discussed above. Other test conditions are obtained by setting the second receiver voltage $R_2$ to $q_{2(12)}$, such that the two RF signals transmitted by the second transmitter channel 532 cancel, and by setting the third receiver voltage $R_3$ to $q_{3(12)}$, such that the two RF signals transmitted by the third transmitter channel 533 cancel. These three orthogonal test conditions are summarized with the following matrix notation:

$$S \begin{bmatrix} 1 & 1 & 1 & 1 & q_{1(12)} & q_{1(12)} & q_{1(12)} & q_{1(12)} & 0 & 0 & 0 & 0 \\ 1 & 1 & 1 & 1 & q_{2(12)} & q_{2(12)} & q_{2(12)} & q_{2(12)} & 0 & 0 & 0 & 0 \\ 1 & 1 & 1 & 1 & q_{3(12)} & q_{3(12)} & q_{3(12)} & q_{3(12)} & 0 & 0 & 0 & 0 \end{bmatrix}$$

$$\begin{bmatrix} H_1 Y_{11} \\ H_2 Y_{21} \\ H_3 Y_{31} \\ H_X Y_{X1} \\ H_1 Y_{12} \\ H_2 Y_{22} \\ H_3 Y_{32} \\ H_X Y_{X2} \\ H_1 Y_{13} \\ H_2 Y_{23} \\ H_3 Y_{33} \\ H_X Y_{X3} \end{bmatrix} = \begin{bmatrix} R(4) \\ R(5) \\ R(6) \end{bmatrix}$$

Again, the cancellation terms in these conditions may be indicated as follows:

$$SH_1 Y_{11} + q_{1(12)} SH_1 Y_{12} = 0 \qquad \text{Equation (11A)}$$

$$SH_2 Y_{21} + q_{2(12)} SH_2 Y_{22} = 0 \qquad \text{Equation (11B)}$$

$$SH_3 Y_{31} + q_{3(12)} SH_3 Y_{32} = 0 \qquad \text{Equation (11C)}$$

Substituting zeros in the corresponding matrix entries for the scaling factors $q_{1(12)}$, $q_{2(12)}$ and $q_{3(12)}$, respectively, the matrix is rewritten as follows:

$$S \begin{bmatrix} 0 & 1 & 1 & 1 & 0 & q_{1(12)} & q_{1(12)} & q_{1(12)} & 0 & 0 & 0 & 0 \\ 1 & 0 & 1 & 1 & q_{2(12)} & 0 & q_{2(12)} & q_{2(12)} & 0 & 0 & 0 & 0 \\ 1 & 1 & 0 & 1 & q_{3(12)} & q_{3(12)} & 0 & q_{3(12)} & 0 & 0 & 0 & 0 \end{bmatrix}$$

$$\begin{bmatrix} H_1 Y_{11} \\ H_2 Y_{21} \\ H_3 Y_{31} \\ H_X Y_{X1} \\ H_1 Y_{12} \\ H_2 Y_{22} \\ H_3 Y_{32} \\ H_X Y_{X2} \\ H_1 Y_{13} \\ H_2 Y_{23} \\ H_3 Y_{33} \\ H_X Y_{X3} \end{bmatrix} = \begin{bmatrix} R(4) \\ R(5) \\ R(6) \end{bmatrix}$$

The same analysis is applied to the other activated pairs of receivers. That is, other orthogonal test conditions are obtained by considering cancellations at the first receiver 551 and third receiver 553 (applying $q_{1(13)}$, $q_{2(13)}$ and $q_{3(13)}$), and cancellations at the second receiver 552 and the third receiver 553 (applying $q_{1(23)}$, $q_{2(23)}$ and $q_{3(13)}$. Also, the final set of P (e.g., 12) orthogonal equations are assembled in matrix form (in block S714 of FIG. 7) by taking the M (e.g., 3) equations obtained from the activation of single receivers, and the P minus M (e.g., 9) equations obtained from the activation of pairs of receivers which result in cancellation of the RF signals from specified transmitter channels.

In the example of three receivers (and three corresponding probe antennas) and consideration of a subset of three transmitter channels, the assembled orthogonal equations in matrix form of Equation (9) is as follows:

$$S \begin{bmatrix} 1 & 1 & 1 & 1 & 0 & 0 & 0 & 0 & 0 & 0 & 0 & 0 \\ 0 & 0 & 0 & 0 & 1 & 1 & 1 & 1 & 0 & 0 & 0 & 0 \\ 0 & 0 & 0 & 0 & 0 & 0 & 0 & 0 & 1 & 1 & 1 & 1 \\ 0 & 1 & 1 & 1 & 0 & q_{1(12)} & q_{1(12)} & q_{1(12)} & 0 & 0 & 0 & 0 \\ 1 & 0 & 1 & 1 & q_{2(12)} & 0 & q_{2(12)} & q_{2(12)} & 0 & 0 & 0 & 0 \\ 1 & 1 & 0 & 1 & q_{3(12)} & q_{3(12)} & 0 & q_{3(12)} & 0 & 0 & 0 & 0 \\ 0 & 1 & 1 & 1 & 0 & 0 & 0 & 0 & q_{1(13)} & q_{1(13)} & q_{1(13)} \\ 1 & 0 & 1 & 1 & 0 & 0 & 0 & q_{2(13)} & 0 & q_{2(13)} & q_{2(13)} \\ 1 & 1 & 0 & 1 & 0 & 0 & 0 & q_{3(13)} & q_{3(13)} & 0 & q_{3(13)} \\ 0 & 0 & 0 & 0 & 0 & 1 & 1 & 1 & 0 & q_{1(23)} & q_{1(23)} & q_{1(23)} \\ 0 & 0 & 0 & 0 & 1 & 0 & 1 & 1 & q_{2(23)} & 0 & q_{2(23)} & q_{2(23)} \\ 0 & 0 & 0 & 0 & 1 & 1 & 0 & 1 & q_{3(23)} & q_{3(23)} & 0 & q_{3(23)} \end{bmatrix} \begin{bmatrix} H_1 Y_{11} \\ H_2 Y_{21} \\ H_3 Y_{31} \\ H_X Y_{X1} \\ H_1 Y_{12} \\ H_2 Y_{22} \\ H_3 Y_{32} \\ H_X Y_{X2} \\ H_1 Y_{13} \\ H_2 Y_{23} \\ H_3 Y_{33} \\ H_X Y_{X3} \end{bmatrix} = \begin{bmatrix} R(1) \\ R(2) \\ R(3) \\ R(4) \\ R(5) \\ R(6) \\ R(7) \\ R(8) \\ R(9) \\ R(10) \\ R(11) \\ R(12) \end{bmatrix}$$

The placement of the zeros substituted for selected scaling factors $q_{n(xy)}$ in the matrix [Q] make the matrix [Q] invertible, as discussed above. Therefore, the matrix form of Equation (10), for isolating the vector of P transmitter products $H_n Y_{nm}$ is as follows:

$$\begin{bmatrix} H_1 Y_{11} \\ H_2 Y_{21} \\ H_3 Y_{31} \\ H_X Y_{X1} \\ H_1 Y_{12} \\ H_2 Y_{22} \\ H_3 Y_{32} \\ H_X Y_{X2} \\ H_1 Y_{13} \\ H_2 Y_{23} \\ H_3 Y_{33} \\ H_X Y_{X3} \end{bmatrix} = \frac{1}{S} \begin{bmatrix} 1 & 1 & 1 & 1 & 0 & 0 & 0 & 0 & 0 & 0 & 0 & 0 \\ 0 & 0 & 0 & 0 & 1 & 1 & 1 & 1 & 0 & 0 & 0 & 0 \\ 0 & 0 & 0 & 0 & 0 & 0 & 0 & 0 & 1 & 1 & 1 & 1 \\ 0 & 1 & 1 & 1 & 0 & q_{1(12)} & q_{1(12)} & q_{1(12)} & 0 & 0 & 0 & 0 \\ 1 & 0 & 1 & 1 & q_{2(12)} & 0 & q_{2(12)} & q_{2(12)} & 0 & 0 & 0 & 0 \\ 1 & 1 & 0 & 1 & q_{3(12)} & q_{3(12)} & 0 & q_{3(12)} & 0 & 0 & 0 & 0 \\ 0 & 1 & 1 & 1 & 0 & 0 & 0 & 0 & q_{1(13)} & q_{1(13)} & q_{1(13)} \\ 1 & 0 & 1 & 1 & 0 & 0 & 0 & q_{2(13)} & 0 & q_{2(13)} & q_{2(13)} \\ 1 & 1 & 0 & 1 & 0 & 0 & 0 & q_{3(13)} & q_{3(13)} & 0 & q_{3(13)} \\ 0 & 0 & 0 & 0 & 0 & 1 & 1 & 1 & 0 & q_{1(23)} & q_{1(23)} & q_{1(23)} \\ 0 & 0 & 0 & 0 & 1 & 0 & 1 & 1 & q_{2(23)} & 0 & q_{2(23)} & q_{2(23)} \\ 0 & 0 & 0 & 0 & 1 & 1 & 0 & 1 & q_{3(23)} & q_{3(23)} & 0 & q_{3(23)} \end{bmatrix}^{-1} \begin{bmatrix} R(1) \\ R(2) \\ R(3) \\ R(4) \\ R(5) \\ R(6) \\ R(7) \\ R(8) \\ R(9) \\ R(10) \\ R(11) \\ R(12) \end{bmatrix}$$

Referring again to FIG. 6, once the transmitter products $H_1Y_1$, $H_1Y_{12}$, $H_1Y_{13}$, $H_2Y_{21}$, $H_2Y_{22}$, $H_2Y_{23}$, $H_3Y_{31}$, $H_3Y_{32}$ and $H_3Y_{33}$ are isolated in block S613 from the combined outputs, a relative value is determined in block S614 between complex gain of at least one transmitter channel of the first, second and third transmitter channels 531, 532 and 533 at the selected complex gain setting (e.g., second complex gain setting) and a previous complex gain of the same at least one receiver channel at a previous or reference selected complex gain setting (e.g., first complex gain setting) using the isolated transmitter products from block S613, where previous transmitter products have been determined at the previous selected complex gain setting in the same manner described above.

For example, assuming for purposes of illustration that the difference in complex gains is to be determined for the first transmitter channel 531, a first (previous) complex gain setting is established by the user for the first transmitter channel 531. The complex gain settings may be established by electronic and/or mechanical controls on or otherwise supported by the phased array antenna 520, for example, as would be known to one skilled in the art. An isolated first transmitter product for the first complex gain setting is determined, in the manner discussed above. A second (current) complex gain setting is established for the first transmitter channel 531, and an isolated second receiver product for the second complex gain setting is determined, also in the manner discussed above. A ratio between the isolated first transmitter product for the first complex gain setting and the isolated second transmitter product for the second complex gain setting is then determined. The complex path losses of each of the isolated first and second transmitter products cancel out in the ratio. Therefore, the ratio indicates the difference between the first complex gain and the second complex gain of the first transmitter channel 531 resulting from the change from the first complex gain setting to the second complex gain setting. The difference between the first and second complex gains should be consistent with the first and second complex gain settings of the first transmitter channel 531.

In an embodiment, the amplitude and phase of the complex gain of the at least one transmitter channel may be established and/or analyzed separately. For example, the complex gain settings of the first, second and third transmitter channels 531, 532 and 533 may include separate amplitude and phase settings. Accordingly, determining the relative value of the complex gains would include determining a first relative value between the gain amplitude of the at least one transmitter channel at the selected amplitude setting and a previous gain amplitude of the at least one transmitter channel at a previous selected amplitude setting using the isolated receiver products. Likewise, determining a second relative value between the gain phase of the at least one transmitter channel at the selected phase setting and a previous gain phase of the at least one transmitter channel at a previous selected phase setting using the isolated transmitter products. This may provide more detailed information as to what may cause unexpected differences between the first and second complex gains. Similarly, even where the complex gain settings do not include separate amplitude and phase settings, the relative value of the complex gains may still be determined using first and second relative values between the gain amplitude and the gain phase of the at least one transmitter channel.

Of course, relative values between complex gains of transmitter channels other than the first transmitter channel 531 may be determined in the same manner. Also, the relative values between complex gains of more than one transmitter channel may be determined in the same manner at substantially the same time.

In block S615, it is determined whether the at least one transmitter channel for which the relative value of complex gains has been determined is functioning properly. This may be done by comparing the determined relative value of the complex gains (e.g., the ratio indicating the difference between the first complex gain and the second complex gain) with a ratio of expected complex gains corresponding to the first and second complex gain settings of the at least one transmitter channel. This may be done, for example, by dividing the gain amplitude setting by the previous gain amplitude setting, and subtracting the previous gain phase setting from the gain phase setting to determine the ratio of the two complex gain settings, in the same manner discussed above with respect to determining whether the at least one receiver channel is functioning properly. When the ratio of the determined complex gains is substantially the same as the ratio of expected complex gains from the complex gain settings, the at least one transmitter channel is determined to be functioning properly.

Determinations of whether each of the first, second and third transmitter channels 531, 532 and 533 is functioning properly are useful in determining the quality of the phased array antenna, as a finished product or during fabrication and/or testing. For example, when one of the first, second and third transmitter channels 531, 532 and 533 has ratio of complex gains that departs from the expected ratio based on the complex gain settings, that transmitter channel may be adjusted, or removed and replaced, independently of the other transmitter channels.

Also, before use, an AUT must be calibrated. That is, relative gain amplitudes and phase shifts within a transmitter channel and between transmitter channels must be determined. Therefore, obtaining ratios between complex gains within each transmitter channel constitutes a partial calibration of the AUT with respect to the relative gain and phase shifts within a transmitter channel. This partial or initial calibration may be the used to reduce calibration time during subsequent calibration in a far-field range or a CATR for determining the gain amplitudes and phase shifts between the transmitter channels.

While the invention has been illustrated and described in detail in the drawings and foregoing description, such illustration and description are to be considered illustrative or exemplary and not restrictive; the invention is not limited to the disclosed embodiments.

Aspects of the present invention may be embodied as an apparatus, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

What is claimed is:

1. A method of performing receiver tests of a phased array antenna with a plurality of receiver channels for over-the-air (OTA) reception and a single combined output using a test system comprising a plurality of probe antennas for transmitting radio frequency (RF) signals, respectively, the method of performing the receiver tests comprising:

receiving the RF signals at each of the receiver channels over propagation paths corresponding to the probe antennas, respectively, wherein each of the receiver channels is set at a selected complex gain setting of a plurality of available complex gain settings, wherein each of the available complex gain settings selects a corresponding gain amplitude and gain phase;

measuring a combined receive signal output from the single combined output of the phased array antenna, the combined receive signal comprising the received RF signals from the receiver channels;

isolating complex gain and complex path loss products from the measured combined receive signal corresponding to the selected complex gain setting and the propagation paths at each of the receiver channels;

determining a relative value between the complex gain of one receiver channel of the plurality of receiver channels at the selected complex gain setting and previous complex gain of the one receiver channel at a previous selected complex gain setting using the isolated complex gain and complex path loss products; and determining whether the one receiver channel is functioning properly and/or partially calibrating the one receiver channel using the determined relative value.

2. The method of claim 1, wherein determining the relative value between the complex gain of one receiver channel and the previous complex gain of the one receiver channel comprises:
  determining a first relative value between gain amplitude of the one receiver channel of the plurality of receiver channels at the selected complex gain setting and previous gain amplitude of the one receiver channel at the previous selected complex gain setting using the isolated complex gain and complex path loss products; and
  determining a second relative value between gain phase of the one receiver channel of the plurality of receiver channels at the selected complex gain setting and previous gain phase of the one receiver channel at the previous selected complex gain setting using the isolated complex gain and complex path loss products.

3. The method of claim 1, wherein isolating the complex gain and complex path loss products ($X_{nm}G_n$) from the measured combined receive signal (R) comprises:
  selecting all receiver channels or a subset of the receiver channels wherein, for a subset of N receiver channels chosen from a total of $N_0$ channels and M probe antennas, the number P of complex gain and complex path loss products to be determined is $MN_0$, when N equals $N_0$, or $M(N+1)$, when N is less than $N_0$;
  measuring voltage of the combined receive signal R(p) for each of P orthogonal test conditions represented mathematically as P orthogonal equations that are linear sums of the P complex gain and complex path loss products each scaled by associated source voltages applied to the probe antennas;
  assembling the P orthogonal equations in matrix form, equating the measured voltage of the combined receive signal R(p) to a mathematical representation of each of the P orthogonal test conditions:

$$S[K]X_{nm}G_n = R$$

wherein S is a source voltage applied to a first probe antenna of the plurality of probe antennas, [K] is a P×P matrix of voltages of the plurality of probe antennas normalized to the source voltage S, $X_{nm}G_n$ is a vector of the P complex gain and complex path loss products to be determined, and R is a vector of P combined receive signal measurements; and
  solving for the vector $X_{nm}G_n$ mathematically.

4. The method of claim 3, wherein the isolated complex gain and complex path loss products $X_{nm}G_n$ are determined by multiplying both sides of the mathematical representation by the inverse of the matrix [K] and dividing through by S:

$$X_{nm}G_n = \frac{1}{S}[K]^{-1}R.$$

5. The method of claim 3, wherein, for M equals three probe antennas, assembling the P orthogonal equations in matrix form comprises:
  taking three orthogonal equations obtained from stimulating one probe antenna, and P minus three orthogonal equations obtained from stimulating pairs of the three probe antennas that result in voltage cancellation at inputs to specified receiver channels,
  wherein, considering a subset of three receiver channels, the P orthogonal equations assembled in matrix form is:

$$S\begin{bmatrix} 1 & 1 & 1 & 1 & 0 & 0 & 0 & 0 & 0 & 0 & 0 & 0 \\ 0 & 0 & 0 & 0 & 1 & 1 & 1 & 1 & 0 & 0 & 0 & 0 \\ 0 & 0 & 0 & 0 & 0 & 0 & 0 & 0 & 1 & 1 & 1 & 1 \\ 0 & 1 & 1 & 1 & 0 & k_{1(12)} & k_{1(12)} & k_{1(12)} & 0 & 0 & 0 & 0 \\ 1 & 0 & 1 & 1 & k_{2(12)} & 0 & k_{2(12)} & k_{2(12)} & 0 & 0 & 0 & 0 \\ 1 & 1 & 0 & 1 & k_{3(12)} & k_{3(12)} & 0 & k_{3(12)} & 0 & 0 & 0 & 0 \\ 0 & 1 & 1 & 1 & 0 & 0 & 0 & 0 & 0 & k_{1(13)} & k_{1(13)} & k_{1(13)} \\ 1 & 0 & 1 & 1 & 0 & 0 & 0 & 0 & k_{2(13)} & 0 & k_{2(13)} & k_{2(13)} \\ 1 & 1 & 0 & 1 & 0 & 0 & 0 & 0 & k_{3(13)} & k_{3(13)} & 0 & k_{3(13)} \\ 0 & 0 & 0 & 0 & 0 & 1 & 1 & 1 & 0 & k_{1(23)} & k_{1(23)} & k_{1(23)} \\ 0 & 0 & 0 & 0 & 1 & 0 & 1 & 1 & k_{2(23)} & 0 & k_{2(23)} & k_{2(23)} \\ 0 & 0 & 0 & 0 & 1 & 1 & 0 & 1 & k_{3(23)} & k_{3(23)} & 0 & k_{3(23)} \end{bmatrix} \begin{bmatrix} X_{11}G_1 \\ X_{21}G_2 \\ X_{31}G_3 \\ X_{X1}G_X \\ X_{12}G_1 \\ X_{22}G_2 \\ X_{32}G_3 \\ X_{X2}G_X \\ X_{13}G_1 \\ X_{23}G_2 \\ X_{33}G_3 \\ X_{X3}G_X \end{bmatrix} = \begin{bmatrix} R(1) \\ R(2) \\ R(3) \\ R(4) \\ R(5) \\ R(6) \\ R(7) \\ R(8) \\ R(9) \\ R(10) \\ R(11) \\ R(12) \end{bmatrix}$$

wherein $k_{1(xy)}$ are scaling factors associated with a first receiver channel, and xy identify the stimulated pairs of the three probe antennas such that for each stimulated pair of probe antennas, when the source voltage S is applied to x probe antenna and the source voltage S times $k_{1(xy)}$ is applied to y probe antenna, signals arriving at the first receiver channel from the stimulated pair cancel;

wherein $k_{2(xy)}$ are scaling factors associated with a second receiver channel, and xy identify the stimulated pairs of the three probe antennas such that for each stimulated pair of probe antennas, when the source voltage S is applied to x probe antenna and the source voltage S times $k_{1(xy)}$ is applied to y probe antenna, signals arriving at the second receiver channel from the stimulated pair cancel; and wherein $k_{3(xy)}$ are scaling factors associated with a third receiver channel, and xy identify the stimulated pairs of the three probe antennas such that for each stimulated pair of probe antennas, when the source voltage S is applied to x probe antenna and the source voltage S times $k_{1(xy)}$ is applied to y probe antenna, signals arriving at the third receiver channel from the stimulated pair cancel;

wherein $X_{Xm}G_X$ is the summation of the complex gain and complex path loss products from m probe antenna to all receiver channels not in the subset of three receiver channels under consideration; and wherein for the P minus M equations obtained from the voltage cancellation at the inputs to specified receiver channels, matrix coefficients for the pair of cancelling $X_{nm}G_n$ terms are set to zero.

6. The method of claim 5, wherein determining the scaling factors that cause the signals arriving at a specified receive channel of the first, second and third receiver channels from the pairs of x and y probe antennas to cancel comprises:
- setting the source voltage applied to a pair of probe antennas to be the same;
- measuring the combined receive signal; and
- while maintaining the source voltage on one probe antenna, adjusting magnitude and phase of the source voltage of the other probe antenna in the pair of probe antennas until the signals arriving at the specified receive channel cancel, wherein the cancellation is achieved and identified when changing the complex gain of the specified receive channel does not change the magnitude or the phase of voltage of the measured combined receive signal at the combined receiver output.

7. The method of claim 2, wherein determining the first and second relative values between the gain amplitude and gain phase of the one receiver channel at the selected complex gain setting and the previous gain amplitude and gain phase of the one receiver channel at the previous selected complex gain setting comprises:
- for each receiver channel in a subset of receiver channels where a change in the gain amplitude and/or the gain phase is to be determined, establishing a first complex gain setting in the receiver channel and determining the isolated complex gain and complex path loss product for the first complex gain setting;
- for each receiver channel in the subset of receiver channels where the change in the gain amplitude and/or the gain phase is to be determined, establishing a second complex gain setting in the receiver channel and determining the isolated complex gain and complex path loss product for the second complex gain setting; and
- for each receiver channel in the subset of receiver channels where the change in the gain amplitude and/or the gain phase is to be determined, computing a ratio between the isolated complex gain and complex path loss product determined for the first complex gain setting and the isolated complex gain and complex path loss product determined for the second complex gain setting,
- wherein complex path losses cancel out in the ratio computed for each receiver channel, such that the ratio indicates a difference in the gain amplitude and/or a difference in the gain phase of the receiver channel resulting from the change from the first complex gain setting to the second complex gain setting.

8. The method of claim 7, wherein each receiver channel is determined to be functioning properly when the difference in the gain amplitude and/or the difference in the gain phase of the receiver channel corresponds to an expected difference between the previous selected complex gain setting and the selected complex gain setting of the receiver channel.

9. The method of claim 1, wherein the test system has three probe antennas when the phased array antenna has three or more receiver channels.

10. The method of claim 1, wherein the test system has two probe antennas when the phased array antenna has two receiver channels.

11. A method of performing over the air (OTA) testing of a plurality of receiver channels in a phased array antenna using a test system comprising a plurality of probe antennas for transmitting radio frequency (RF) signals at source voltages, respectively, and a combiner for combining receive signals from the plurality of receiver channels, the method comprising:
- setting each of the plurality of receiver channels to a reference complex gain setting;
- receiving first receive signals transmitted from the probe antennas at each of the receiver channels, wherein the first receive signals include source voltages from single probe antennas and pairs of the source voltages of respective pairs of the probe antennas applied to each of the receiver channels;
- determining first scaling factors of each of the receiver channels that, when applied to the pairs of the source voltages applied to each of the receiver channels, cause the corresponding first receive signals to cancel out, to provide a first set of first scaling factors;
- measuring first combined receive signals output from a single combined output of the phased array antenna, the first combined receive signals comprising the received first receive signals from the plurality of receiver channels;
- determining a first set of first complex gain and complex path loss products associated with propagation paths between the receiver channels and the probe antennas, respectively, using the measured first combined receive signals and the first set of first scaling factors;
- setting at least one receiver channel of the plurality of receiver channels to a different complex gain setting, while maintaining each remaining receiver channel of the plurality of receiver channels at the reference complex gain setting;
- receiving second receive signals transmitted from the probe antennas at each of the receiver channels using source voltages from single probe antennas and pairs of the source voltages of the probe antennas, respectively, applied to each of the receiver channels;
- measuring second combined receive signals output from the single combined output of the phased array antenna, the second combined receive signals comprising the received second receive signals from the plurality of receiver channels;
- determining a second set of second complex gain and complex path loss products associated with the propagation paths between the receiver channels and the probe antennas, respectively, using the measured second combined second receive signals and the first set of first scaling factors;
- determining a ratio between the second complex gain and complex path loss product of at least one receiver channel and the first complex gain and complex path loss product of the at least one receiver channel, wherein the ratio indicates a difference in complex gain of the at least one receiver channel resulting from changing the reference complex gain setting to the different complex gain setting; and
- determining whether the at least one receiver channel is functioning properly based on the determined ratio.

12. A system for performing receiver tests of a phased array antenna with a plurality of receiver channels for over-the-air (OTA) reception and a single combined output, the system comprising:
- a plurality of probe antennas for transmitting radio frequency (RF) signals, respectively, wherein the RF signals are received at each of the receiver channels of the phased array antenna over propagation paths corresponding to the probe antennas, respectively, wherein each of the receiver channels is set at a selected complex gain setting of a plurality of available complex gain settings, wherein each of the available complex gain settings selects a corresponding gain amplitude and gain phase; and a processor device; and a non-transitory memory storing instructions that, when executed by the processor device, cause the processor device to:

measure a combined receive signal output from the single combined output of the phased array antenna, the combined receive signal comprising the received RF signals from the receiver channels;

isolate complex gain and complex path loss products from the measured combined receive signal corresponding to the selected complex gain setting and the propagation paths at each of the receiver channels;

determine a relative value between the complex gain of one receiver channel of the plurality of receiver channels at the selected complex gain setting and previous complex gain of the one receiver channel at a previous selected complex gain setting using the isolated complex gain and complex path loss products; and determine whether the one receiver channel is functioning properly and/or partially calibrating the one receiver channel using the determined relative value.

13. The system of claim 12, wherein the instructions cause the processor device to determine the relative value between the complex gain of one receiver channel and the previous complex gain of the one receiver channel by:

determining a first relative value between gain amplitude of the one receiver channel of the plurality of receiver channels at the selected complex gain setting and previous gain amplitude of the one receiver channel at the previous selected complex gain setting using the isolated complex gain and complex path loss products; and determining a second relative value between gain phase of the one receiver channel of the plurality of receiver channels at the selected complex gain setting and previous gain phase of the one receiver channel at the previous selected complex gain setting using the isolated complex gain and complex path loss products.

14. The system of claim 12, wherein the instructions cause the processor device to isolate the complex gain and complex path loss products ($X_{nm}G_n$) from the measured combined receive signal (R) by:

selecting all receiver channels or a subset of the receiver channels wherein, for a subset of N receiver channels chosen from a total of $N_0$ channels and M probe antennas, the number P of complex gain and complex path loss products to be determined is $MN_0$, when N equals $N_0$, or $M(N+1)$, when N is less than $N_0$;

measuring voltage of the combined receive signal R(p) for each of P orthogonal test conditions represented mathematically as P orthogonal equations that are linear sums of the P complex gain and complex path loss products each scaled by associated source voltages applied to the probe antennas;

assembling the P orthogonal equations in matrix form, equating the measured voltage of the combined receive signal R(p) to a mathematical representation of each of the P orthogonal test conditions:

$$S[K]X_{nm}G_n = R$$

wherein S is a source voltage applied to a first probe antenna of the plurality of probe antennas, [K] is a P×P matrix of voltages of the plurality of probe antennas normalized to the source voltage S, $X_{nm}G_n$ is a vector of the P complex gain and complex path loss products to be determined, and R is a vector of P combined receive signal measurements; and solving for the vector $X_{nm}G_n$ mathematically.

15. The system of claim 14, wherein the isolated complex gain and complex path loss products $X_{nm}G_n$ are determined by multiplying both sides of the mathematical representation by the inverse of the matrix [K] and dividing through by S:

$$X_{nm}G_n = \frac{1}{S}[K]^{-1}R.$$

16. The system of claim 14, wherein, for M equals three probe antennas, assembling the P orthogonal equations in matrix form comprises:

taking three orthogonal equations obtained from stimulating one probe antenna, and P minus three orthogonal equations obtained from stimulating pairs of the three probe antennas that result in voltage cancellation at inputs to specified receiver channels, wherein, considering a subset of three receiver channels, the P orthogonal equations assembled in matrix form is:

$$S\begin{bmatrix} 1 & 1 & 1 & 1 & 0 & 0 & 0 & 0 & 0 & 0 & 0 & 0 \\ 0 & 0 & 0 & 0 & 1 & 1 & 1 & 1 & 0 & 0 & 0 & 0 \\ 0 & 0 & 0 & 0 & 0 & 0 & 0 & 0 & 1 & 1 & 1 & 1 \\ 0 & 1 & 1 & 1 & 0 & k_{1(12)} & k_{1(12)} & k_{1(12)} & 0 & 0 & 0 & 0 \\ 1 & 0 & 1 & 1 & k_{2(12)} & 0 & k_{2(12)} & k_{2(12)} & 0 & 0 & 0 & 0 \\ 1 & 1 & 0 & 1 & k_{3(12)} & k_{3(12)} & 0 & k_{3(12)} & 0 & 0 & 0 & 0 \\ 0 & 1 & 1 & 1 & 0 & 0 & 0 & 0 & 0 & k_{1(13)} & k_{1(13)} & k_{1(13)} \\ 1 & 0 & 1 & 1 & 0 & 0 & 0 & 0 & k_{2(13)} & 0 & k_{2(13)} & k_{2(13)} \\ 1 & 1 & 0 & 1 & 0 & 0 & 0 & 0 & k_{3(13)} & k_{3(13)} & 0 & k_{3(13)} \\ 0 & 0 & 0 & 0 & 0 & 1 & 1 & 1 & 0 & k_{1(23)} & k_{1(23)} & k_{1(23)} \\ 0 & 0 & 0 & 0 & 1 & 0 & 1 & 1 & k_{2(23)} & 0 & k_{2(23)} & k_{2(23)} \\ 0 & 0 & 0 & 0 & 1 & 1 & 0 & 1 & k_{3(23)} & k_{3(23)} & 0 & k_{3(23)} \end{bmatrix} \begin{bmatrix} X_{11}G_1 \\ X_{21}G_2 \\ X_{31}G_3 \\ X_{X1}G_X \\ X_{12}G_1 \\ X_{22}G_2 \\ X_{32}G_3 \\ X_{X2}G_X \\ X_{13}G_1 \\ X_{23}G_2 \\ X_{33}G_3 \\ X_{X3}G_X \end{bmatrix} = \begin{bmatrix} R(1) \\ R(2) \\ R(3) \\ R(4) \\ R(5) \\ R(6) \\ R(7) \\ R(8) \\ R(9) \\ R(10) \\ R(11) \\ R(12) \end{bmatrix}$$

wherein $k_{1(xy)}$ are scaling factors associated with a first receiver channel, and xy identify the stimulated pairs of the three probe antennas such that for each stimulated pair of probe antennas, when the source voltage S is applied to x probe antenna and the source voltage S times $k_{1(xy)}$ is applied to y probe antenna, signals arriving at the first receiver channel from the stimulated pair cancel;

wherein $k_{2(xy)}$ are scaling factors associated with a second receiver channel, and xy identify the stimulated pairs of the three probe antennas such that for each stimulated pair of probe antennas, when the source voltage S is applied to x probe antenna and the source voltage S times $k_{1(xy)}$ is applied to y probe antenna, signals arriving at the second receiver channel from the stimulated pair cancel; and wherein $k_{3(xy)}$ are scaling factors associated with a third receiver channel, and xy identify the stimulated pairs of the three probe antennas such that for each stimulated pair of probe antennas, when the source voltage S is applied to x probe antenna and the source voltage S times $k_{1(xy)}$ is applied to y probe antenna, signals arriving at the third receiver channel from the stimulated pair cancel;

wherein $X_{Xm}G_X$ is the summation of the complex gain and complex path loss products from m probe antenna to all receiver channels not in the subset of three receiver channels under consideration; and wherein for the P minus M equations obtained from the voltage cancellation at the inputs to specified receiver channels, matrix coefficients for the pair of cancelling $X_{nm}G_n$ terms are set to zero.

17. The system of claim 16, wherein determining the scaling factors that cause the signals arriving at a specified receive channel of the first, second and third receiver channels from the pairs of x and y probe antennas to cancel comprises:

setting the source voltage applied to a pair of probe antennas to be the same;

measuring the combined receive signal; and while maintaining the source voltage on one probe antenna, adjusting magnitude and phase of the source voltage of the other probe antenna in the pair of probe antennas until the signals arriving at the specified receive channel cancel, wherein the cancellation is achieved and identified when changing the complex gain of the specified receive channel does not change the magnitude or the phase of voltage of the measured combined receive signal at the combined receiver output.

18. The system of claim 13, wherein determining the first and second relative values between the gain amplitude and gain phase of the one receiver channel at the selected complex gain setting and the previous gain amplitude and gain phase of the one receiver channel at the previous selected complex gain setting comprises:

for each receiver channel in a subset of receiver channels where a change in the gain amplitude and/or the gain phase is to be determined, establishing a first complex gain setting in the receiver channel and determining the isolated complex gain and complex path loss product for the first complex gain setting;

for each receiver channel in the subset of receiver channels where the change in the gain amplitude and/or the gain phase is to be determined, establishing a second complex gain setting in the receiver channel and determining the isolated complex gain and complex path loss product for the second complex gain setting; and for each receiver channel in the subset of receiver channels where the change in the gain amplitude and/or the gain phase is to be determined, computing a ratio between the isolated complex gain and complex path loss product determined for the first complex gain setting and the isolated complex gain and complex path loss product determined for the second complex gain setting, wherein complex path losses cancel out in the ratio computed for each receiver channel, such that the ratio indicates a difference in the gain amplitude and/or a difference in the gain phase of the receiver channel resulting from the change from the first complex gain setting to the second complex gain setting.

19. The system of claim 18, wherein each receiver channel is determined to be functioning properly when the difference in the gain amplitude and/or the difference in the gain phase of the receiver channel corresponds to an expected difference between the previous selected complex gain setting and the selected complex gain setting of the receiver channel.

20. The system of claim 12, wherein the plurality of probe antennas consist of three probe antennas when the phased array antenna has three or more receiver channels, and wherein the plurality of probe antennas consist of probe antennas when the phased array antenna has two receiver channels.

* * * * *